United States Patent
Hsu et al.

(10) Patent No.: US 6,405,105 B1
(45) Date of Patent: Jun. 11, 2002

(54) METHOD MEANS AND DEVICE FOR LIMITING THE LIGHT PENETRATION THROUGH ONE OR MORE PANE IN A SINGLE VIEWING PORT

(75) Inventors: Jimmy M. Hsu; Peter Y. Hsu; Yuan-Rong Lu, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/213,921

(22) Filed: Dec. 17, 1998

(51) Int. Cl.7 ............................................. G05D 23/00
(52) U.S. Cl. .......................... 700/299; 700/12; 701/36; 701/49
(58) Field of Search .......................... 700/12, 56, 299, 700/300; 160/310; 359/568, 270, 275; 100/120; 49/31; 701/49, 36

(56) References Cited

U.S. PATENT DOCUMENTS

| | | | | |
|---|---|---|---|---|
| 4,290,473 A | * | 9/1981 | Pierson et al. | 160/120 |
| 4,766,941 A | * | 8/1988 | Sloop et al. | 160/241 |
| 4,813,198 A | * | 3/1989 | Johnston et al. | 52/171.3 |
| 5,467,266 A | * | 11/1995 | Jacobs et al. | 700/56 |
| 5,587,828 A | * | 12/1996 | Bernard, Jr. | 359/275 |
| 5,598,000 A | * | 1/1997 | Popat | 250/206 |
| 5,605,013 A | * | 2/1997 | Hogston | 49/31 |
| 5,654,736 A | * | 8/1997 | Green et al. | 345/105 |
| 5,663,621 A | * | 9/1997 | Popat | 318/480 |
| 5,675,487 A | * | 10/1997 | Patterson et al. | 700/56 |
| 5,735,328 A | * | 4/1998 | Salhoff et al. | 160/25 |
| 5,760,558 A | * | 6/1998 | Popat | 318/480 |
| 5,848,634 A | * | 12/1998 | Will et al. | 160/310 |
| 5,883,605 A | * | 3/1999 | Knapp | 345/7 |
| 5,903,247 A | * | 5/1999 | Howard et al. | 345/87 |
| 5,940,216 A | * | 8/1999 | Gibbs | 359/601 |
| 6,039,390 A | * | 3/2000 | Agrawal et al. | 296/211 |
| 6,064,949 A | * | 5/2000 | Werner et al. | 702/134 |
| 6,084,231 A | * | 7/2000 | Popat | 250/214 AL |
| 6,094,306 A | * | 7/2000 | Jain | 359/568 |
| 6,099,131 A | * | 8/2000 | Fletcher et al. | 359/604 |
| 6,130,772 A | * | 10/2000 | Cava | 359/270 |
| 6,138,068 A | * | 10/2000 | Liu | 701/49 |
| 6,181,089 B1 | * | 1/2001 | Kovach et al. | 318/26 |
| 6,253,135 B1 | * | 6/2001 | Hubacher | 701/49 |
| 6,263,272 B1 | * | 7/2001 | Liu et al. | 701/49 |

* cited by examiner

Primary Examiner—Thomas Black
Assistant Examiner—Ronald D. Hartman, Jr.
(74) Attorney, Agent, or Firm—Arnold & Associates; Leslie Van Leeuwen

(57) ABSTRACT

A method, means, and device for controlling the amount of light penetration through a viewing port and, more particularly, a new and improved method of controlling one or more pane such that the one or more pane varies the degree of energy reflection and absorption of a single viewing port.

49 Claims, 19 Drawing Sheets

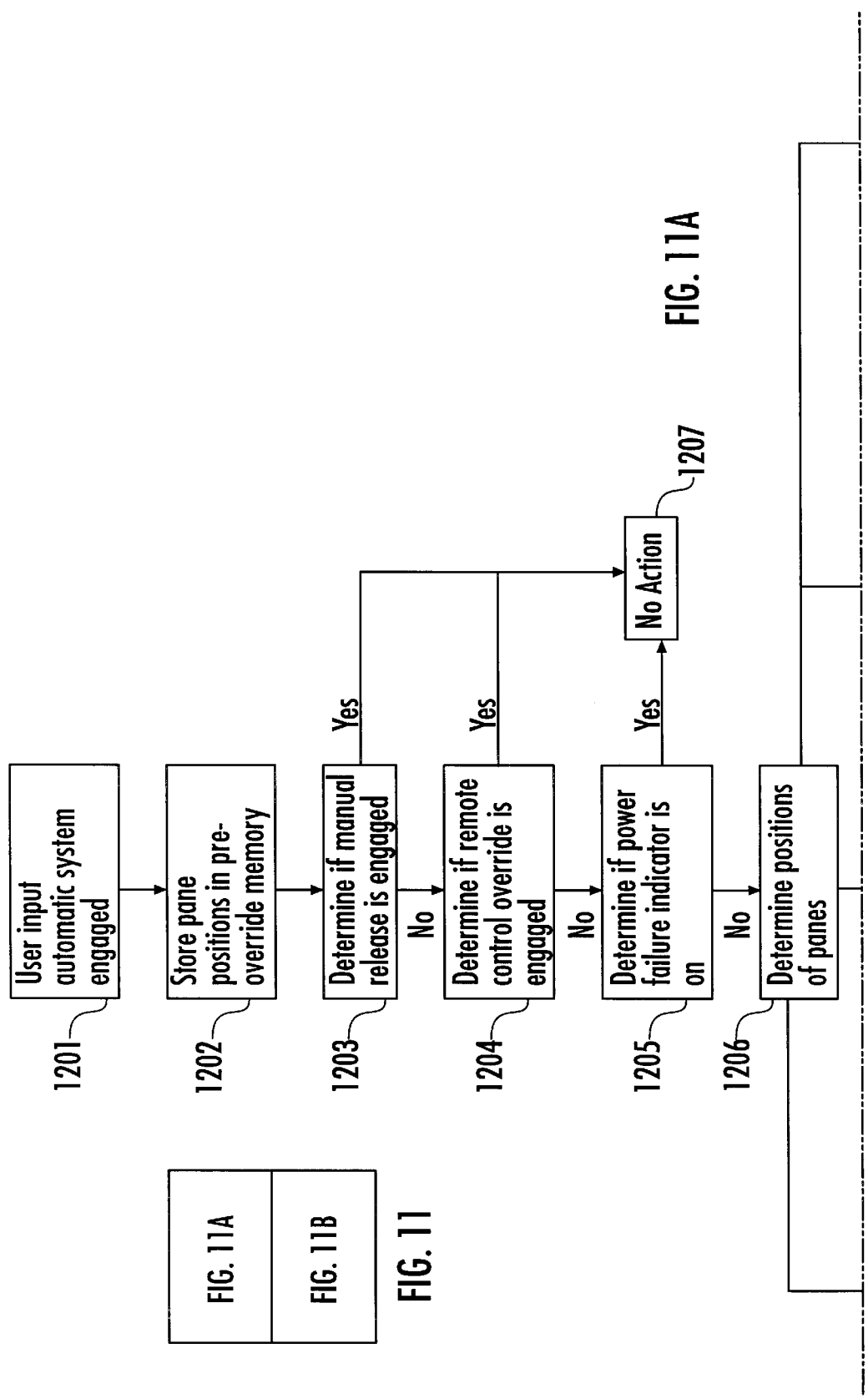

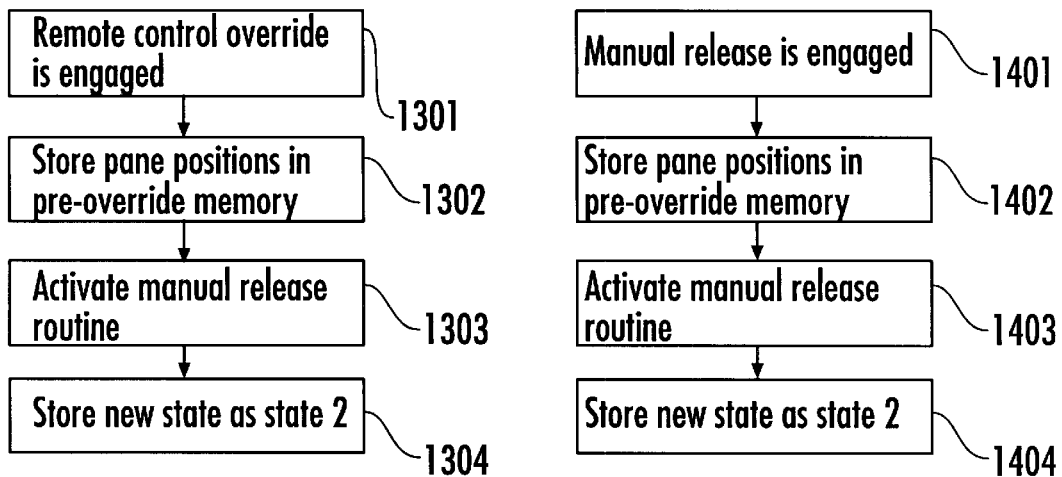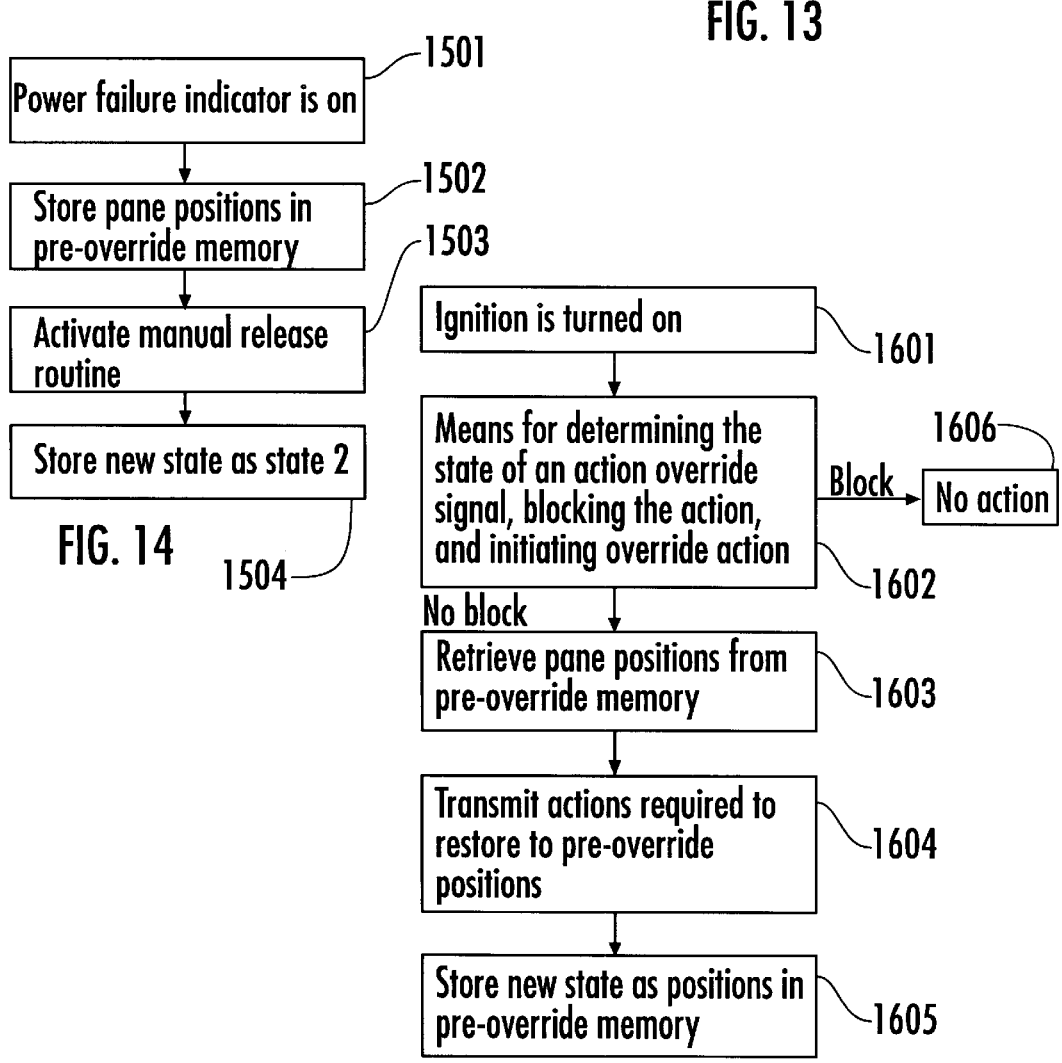

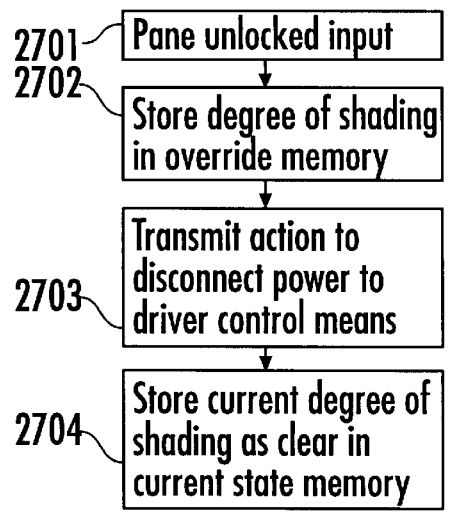
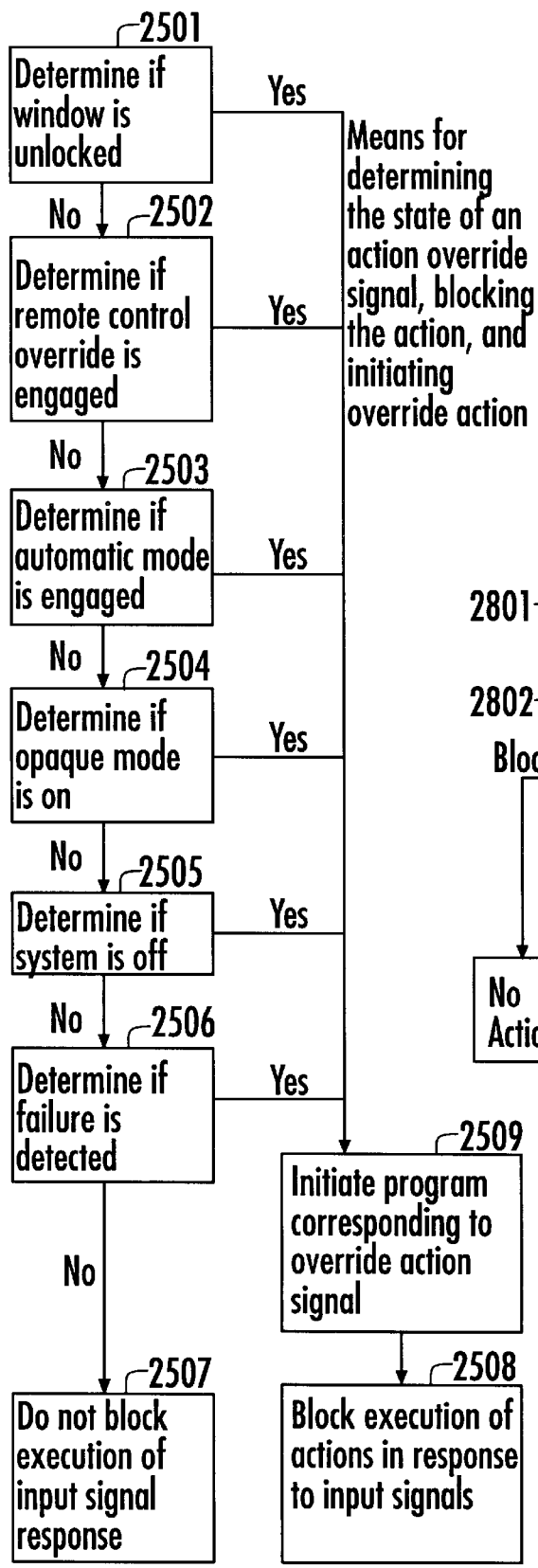
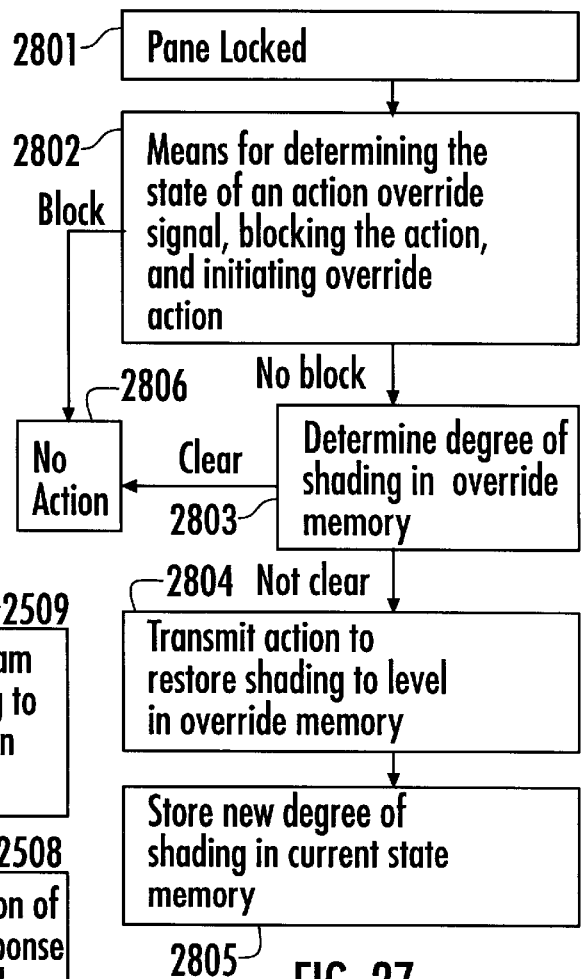

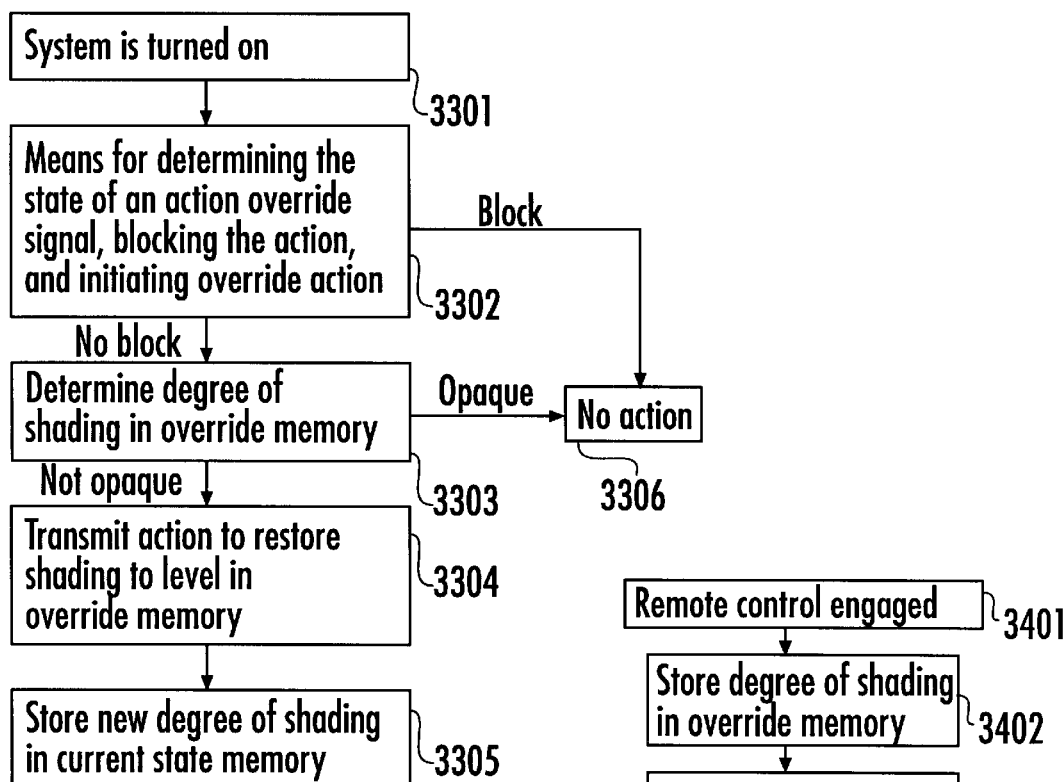
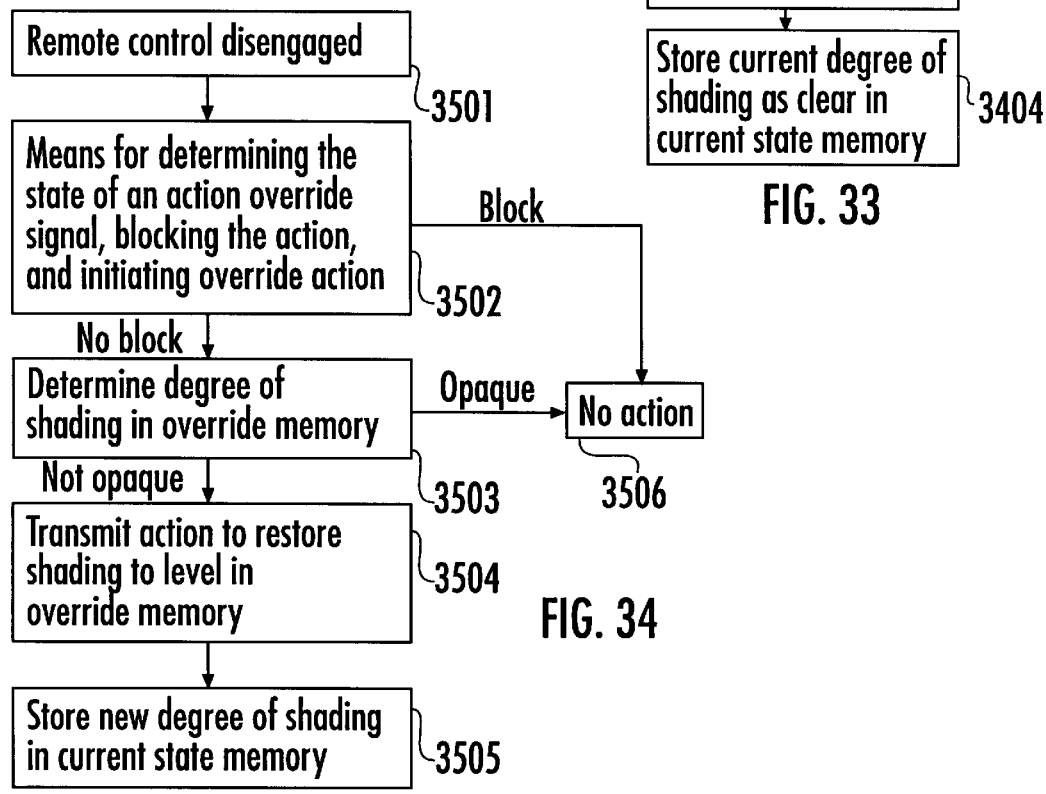

METHOD MEANS AND DEVICE FOR LIMITING THE LIGHT PENETRATION THROUGH ONE OR MORE PANE IN A SINGLE VIEWING PORT

BACKGROUND OF THE INVENTION

1. Field of the Invention

The field of invention relates to a method and device for limiting the amount of light penetration through a viewing port and, more particularly, a new and improved method of controlling one or more pane such that the one or more pane varies the degree of energy reflection and absorption of a single viewing port.

2. Description of the Related Art

Contemporary automobiles, homes, and other structures use a single window pane in a single viewing port. Tint is a popular feature for automobile and house window panes. For example, automobile owners presently use tint to decrease the amount of visible and ultraviolet light that penetrates into the vehicle. Decreasing light penetration protects interior materials from deterioration due to sunlight, increases driving comfort and safety, and reduces a person's visual perception of the automobile's interior from the exterior to the vehicle to deter would-be thieves. However, current tinting techniques are inadequate since they create several problems as well as fall short of the needs of vehicle and home owners.

The following seven examples are problems and deficiencies associated with the prior art tinting techniques. First, a popular tint comprises of a thin film applied to the surface of the glass. The thin film is costly and requires high maintenance since it tends to degrade and bubble within a few of years of installation. Second, the tint film cannot be applied to the front windshield of an automobile lawfully. Therefore the interior of vehicles remain susceptible to light penetration. Third, tint decreases the visual perception of the driver during dark and stormy conditions. Fourth, since the tint cannot be opaque, the tinted windows can neither completely protect an interior of a vehicle or home from the degradation due to sunlight nor keep the interior cool. Therefore, automobile owners resort to sun visors which are inconvenient to store, difficult to install properly, and not 100% effective in blocking out the sunlight. Home owners resort to various blinds, curtains, and other window treatments which are difficult and expensive to maintain. Fifth, would-be thieves are not deterred if they have a source of light, since the tint is not opaque. Sixth, many vehicle owners have alarm systems installed as further protection of the vehicle from would-be thieves, however, alarm systems drain the car's battery while the engine is off. This problem becomes exaggerated in areas such as airport parking lots where low-flying airplanes tend to set off car alarms. Lastly, when thieves decide to break into an automobile, they break a window pane because window panes remain an easy point of access.

While the aforementioned prior art has some areas of effectiveness, it does not sufficiently address the needs of vehicle or home owners, and there is a great need for a better device and method.

SUMMARY OF THE INVENTION

According to one aspect of the invention, a method for changing an amount of light penetration through a viewing port is provided, comprising receiving an input signal, determining the amount of light penetration through the viewing port at the time of said receiving an input signal, performing an action as required to respond to the input signal based on said determining the amount of light penetration through the viewing port at the time of said receiving an input signal, and recording the amount of light penetration through the viewing port after said performing an action.

According to another aspect of the present invention, a device for changing an amount of light penetration through a viewing port is provided, comprising, a means for receiving an input signal, a means for determining the amount of light penetration through the viewing port at the time the input signal is received, a means for performing an action as required to respond to the input signal based on the amount of light penetration through the viewing port at the time the input signal is received, and a means for recording the amount of light penetration through the viewing port after the performance of an action.

According to yet another aspect of the present invention, a device for changing an amount of light penetration through a viewing port is provided, comprising a mode controller containing light penetration modifying functions, an input device in signal communication with said mode controller, and a light penetration recorder in signal communication with said mode controller wherein said mode controller is responsive to said input device and said light penetration recorder is responsive to said mode controller.

These and other aspects of the invention solve various problems in the prior art. First, the thin film applied to the surface of the glass which tends to degrade and bubble within a few of years of installation no longer must be used. The invention provides the ability to use a tinted glass or changeable, light penetration limiting pane in lieu of the thin film. Second, although the tint film cannot be applied to the front windshield of an automobile, the invention provides an alternative feasible means of protecting the interior of an automobile. An opaque pane or a changeable, light penetration limiting pane can be used to block all light from entering the automobile while the automobile is parked. Third, hindrance of visual perception is not a limitation of the invention since a tinted glass can be raised or a changeable, light penetration limiting pane can be shaded during sunny days and lowered or cleared at night or during stormy conditions. Fourth, heating and degradation due to sunlight can be minimized by the invention if opaque panes are raised or changeable, light penetration limiting panes can be turned opaque when occupants are not using the view ports. The invention is also much easier to use than sun visors or conventional window treatments since an embodiment of the invention can be placed in an automatic mode wherein the owners need not concern themselves with the view ports. Fifth, although would-be thieves are not deterred if they have a source of light when tint is used, they are deterred by the invention since opaque panes can be used. Sixth, vehicle alarm systems that drain the vehicle's battery system need no longer be used as further protection of the vehicle since armored opaque panes will act as a strong deterrence. Lastly, although thieves used to consider windows as an easy point of access to a vehicle, armored opaque panes will change this perception.

The foregoing and other objects, features and advantages of the invention will be apparent from the following more particular description of an example embodiment of the invention, as illustrated in the accompanying drawing wherein like reference numbers represent like parts of the embodiment of the invention.

BRIEF DESCRIPTION OF THE DRAWINGS

FIGS. 5–18 depict flow charts of the modes of operation of a logic chip for the first example embodiment of the invention.

FIGS. 22–34 depict flow charts of the modes of operation of a logic chip for the second example embodiment of the invention.

DETAILED DESCRIPTION

Figure 1:
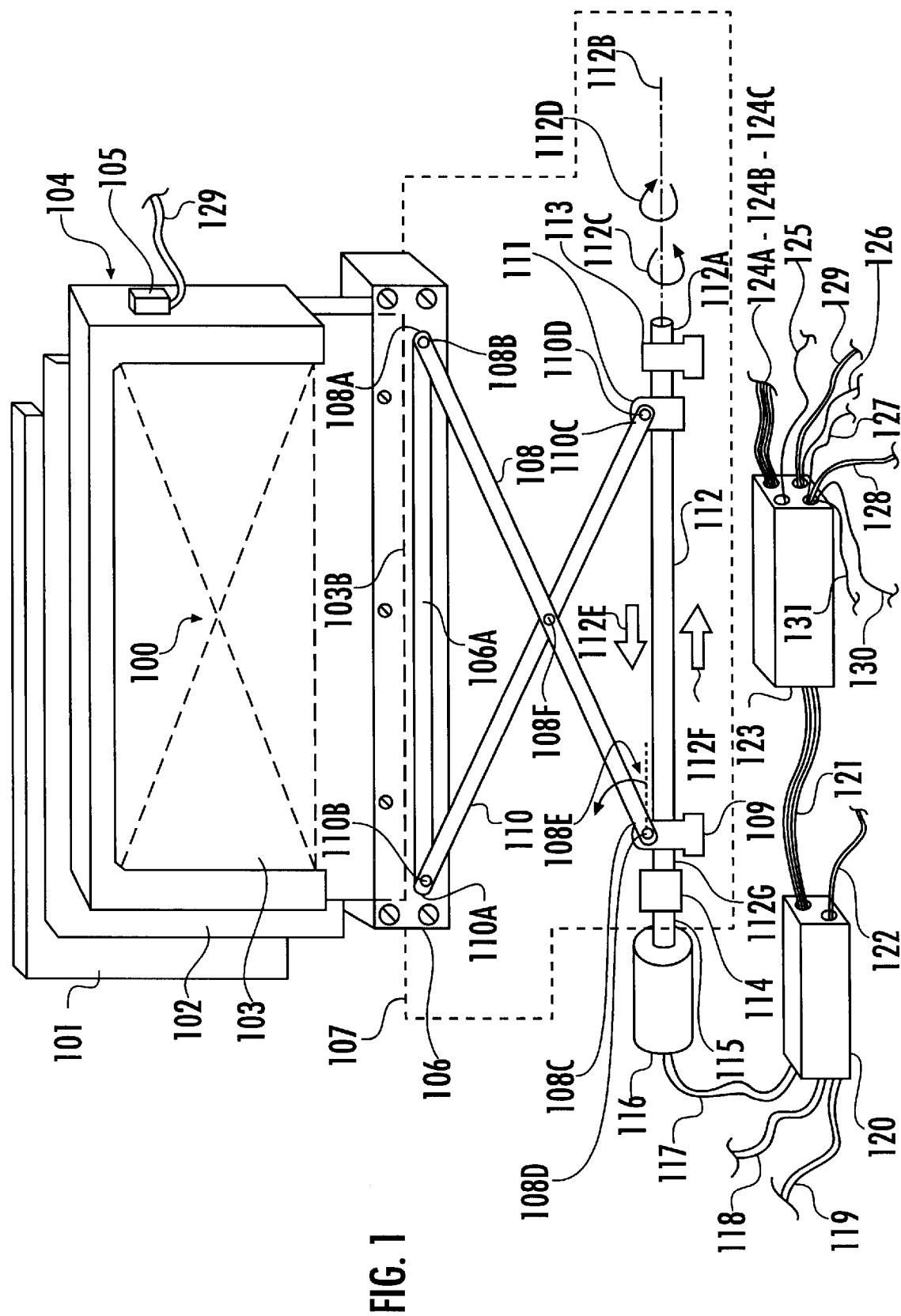
FIG. 1 depicts a first, three-dimensional, example embodiment of the invention.

Referring to FIG. 1, there is shown an example device for changing the position of more than one pane in a single viewing port 100 of an automobile as a first example embodiment of the invention. For clarity, FIG. 1 shows the window pane guides 104, mechanical failure detector 105, pane holder 106, actuator 107, and driver 116 for only one pane although all three panes are shown. For the present embodiment, each pane 101, 102, and 103 has window pane guides 104, a mechanical failure detector 105, a pane holder 106, an actuator 107, and a driver 116 accurately described by the corresponding elements portrayed in FIG. 1. Two additional drivers 514 and 515 are shown in the electrical interconnection drawing, FIG. 4. Therefore, in the discussion below, the window pane guides 104, mechanical failure detector 105, pane holder 106, and actuator 107 will be described as such for each pane 101, 102 and 103. The present example embodiment of the invention comprises:

First, more than one pane comprising a clear glass window pane 103 which is inserted into window pane guides 104 having an attached mechanical failure detector 105, to guide the clear glass pane into a position such that the clear glass pane covers an entire view port 100; a tinted glass window pane 102 which is inserted in the window pane guides 104 having an attached mechanical failure detector 105, in close proximity to the clear glass window pane 103 and positioned such that the tinted glass window pane 102 can cover the entire view port 100; and an opaque armor pane 101 which is inserted in the window pane guides 104 having a mechanical failure detector 105, in close proximity to the tinted glass window pane 102 and positioned such that the opaque armor pane 101 can cover the entire view port 100.

The present example embodiment tailors the invention for use in the side and rear windows in an automobile. Of course, acceptable embodiments of the invention include embodiments incorporated into the front windshields of automobiles, other vehicles, and buildings such as space shuttles, boats, airplanes, houses, office buildings, military command centers, and observatories. In addition, acceptable embodiments of the invention include embodiments in which the panes comprise of materials other than glass and armor such as solar panels, light emitting diode panes, liquid crystal displays (LCD), artwork, lenses, wood doors, glass doors, screen doors, and burglar bars. For example, since the front windshield of an automobile usually does not have tint, the owner may want a two pane system comprising an opaque armor 103 and a LCD display wherein the LCD display can raise during normal driving conditions to display, in user-selected locations, the gauges of the vehicle such as a speedometer, a navigational map, and, at night, an infrared camera view of the road in front of the automobile. Such an embodiment is contemplated by the present invention.

Referring again to FIG. 1, a further feature seen in the illustrated embodiment includes mechanical failure detector 104. The mechanical failure detector 104 is an example safety device for the occupants of an automobile. In alternative embodiments of the invention, however, the mechanical failure detector 104 may be disadvantageous or infeasible.

Referring still to FIG. 1, a window pane holder means 106 is provided, comprising a clamp type window holder 106 having a slot 106A parallel to the bottom edge 103B of the clear glass window pane 103. The present example embodiment shows a particular clamp type of window pane holder 106 with a horizontal slot 106A parallel to the bottom edge 103B of the pane 103. Of course, acceptable embodiments of the invention include other types of pane holders as will occur to those of skill in the art.

Next, an actuator means 107 is also provided in the FIG. 1 embodiment, in which the window pane holder means 106 connects to a first end 108A of a rigid member 108 such that the first end 108A of the rigid member 108 can pivot about a pivot point 108B while sliding in the slot 106A. A second end 108C of the rigid member 108 connects to a connection means 109 such that the second end 108C of the rigid member 108 can pivot in an arc 108E about a pivot point 108D at the second end 108C of the rigid member 108 and the connection means 109. The connection means 109 connects to a screw drive shaft 112 such that the connection means 109 will remain substantially stationary as the screw drive shaft 112 rotates about a center axis 112B of the screw drive shaft 112. A first end 110A of a second rigid member 110 connects to the window pane holder means 106 at a pivot point 110B such that pivot point 110B remains above with no substantial horizontal offset from the pivot point 108D. The second rigid member 110 connects to the rigid member 108 by a connection means 108F such that both the rigid member 108 and the second rigid member 110 pivot, with a substantially equidistant horizontal offset. A second end 110C of the second rigid member 110 connects to a threaded connection means 111 such that the second member 110 pivots about a pivot point 110D. The threaded. connection means 111 connects to the screw drive shaft 112 such that the threaded connection means 111 travels along the screw drive shaft 112 toward a first end 112A of the screw drive shaft 112 when the screw drive shaft 112 rotates in a counterclockwise direction 112C as perceived when looking toward the threaded connection means 111 from the first end 112A of the screw drive shaft 112. The threaded connection means 111 moves in the opposite direction 112E when the screw drive shaft 112 rotates clockwise 112D. The end 112A of the screw drive shaft 112 connects to a connection means 113 such that the end 112A of the screw drive shaft 112 is restricted to substantially rotational movement 112C and 112D. The actuator 107 is constructed such that the balance and frictions allow the panes 101, 102, and 103 to be pushed down when decoupled from each driver 116, 514, and 515, as shown in FIG. 4.

The present example embodiment discusses a particular actuator means. Of course, the invention incorporates other types of actuator means 107 as will occur to those of skill in the art. Acceptable embodiments of an actuator 107 include, for example, pulley type actuators, hydraulic type actuators, spring type actuators, and counterweight type actuators.

Figure 4:
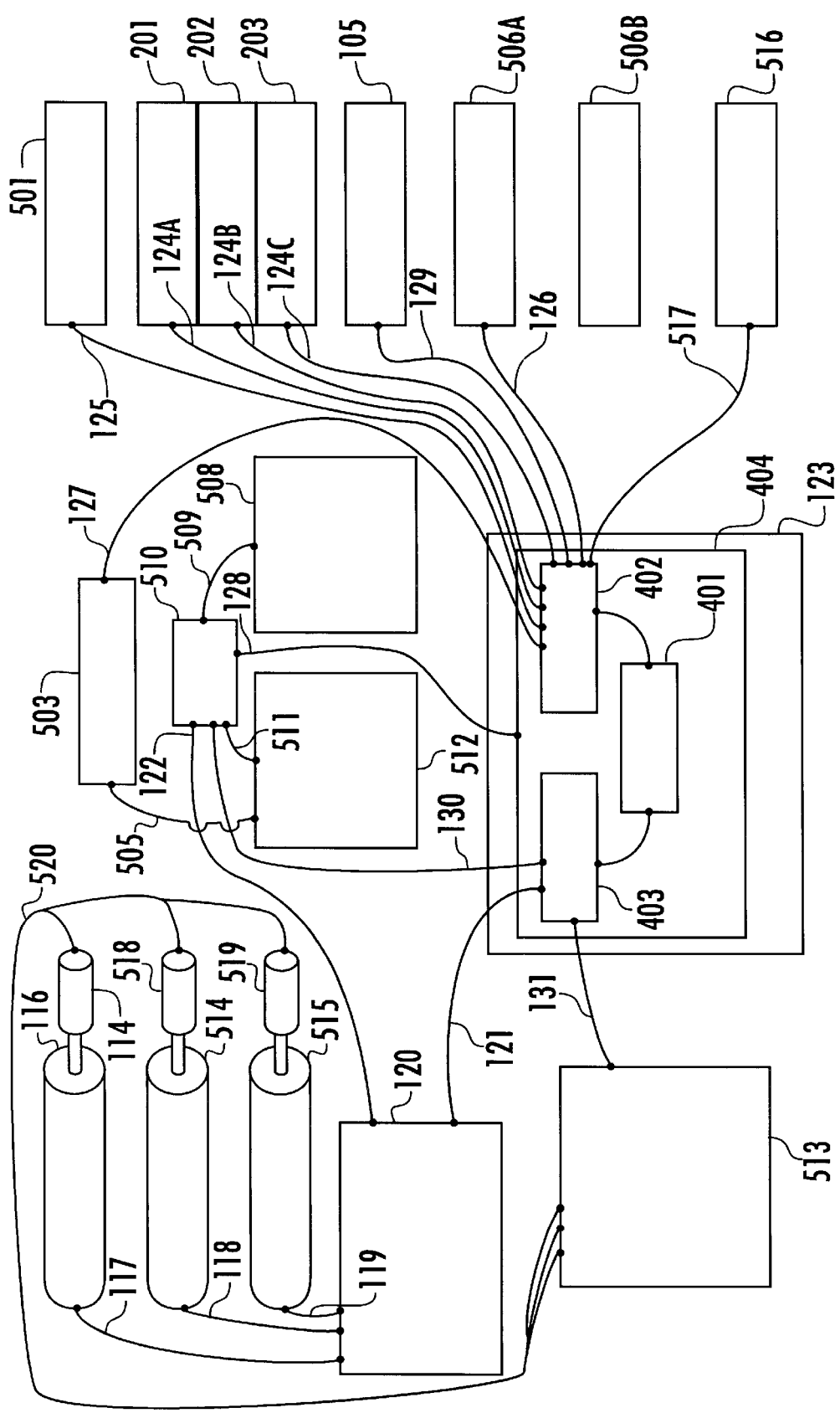
FIG. 4 depicts a single line, electrical interconnection for the first example embodiment of the invention.

Referring now to both FIGS. 1 and 4, an example driver means 116 is seen, comprising a motor 116 having an axle 115 that connects to a second end 112G of the screw driver shaft 112 with a coupling connection means 114, such that the screw driver shaft 112 rotates about a center axis 112B substantially restricted to rotational movement 112C and 112D. The coupling connection means 114 connects to a driver-actuator decoupling means 513, as shown in FIG. 4, by a power transfer means 520 comprising two conductors for each coupling means 114, 518, and 519 or six conductors. A power transfer means 117 connects to the motor 116 comprising two conductors such that power can be transferred to the motor 116 by a driver control means 120.

The present example embodiment discusses a motor 116 which is one particular driver means. Of course, an acceptable embodiment of the invention includes other types of driver means 116 compatible with the actuator means 107. For example, an acceptable embodiment of the invention includes actuators 107 and drivers 116, 514, and 515, such as pulley type actuators with a motors as driver means, hydraulic type actuators with compressors as driver means, spring type actuators with motors as driver means, pneumatic type actuators with air-driven driver means, and counterweight type actuators with hand crank driver means.

Figure 18:
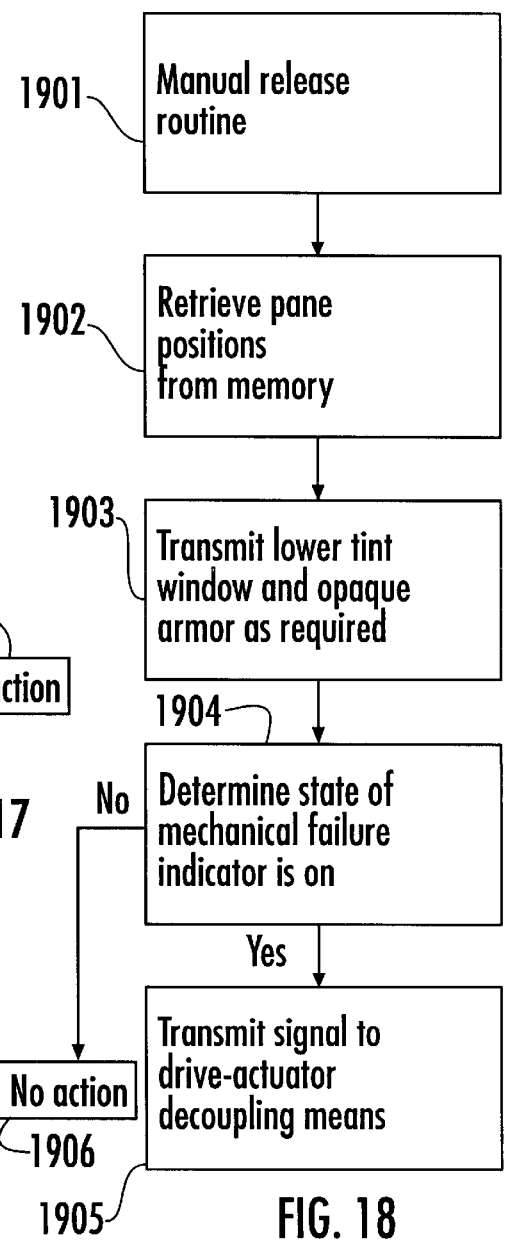

Fifth, referring to FIGS. 1 and 4, a driver control means is shown used in conjunction with a mode control means 123 to power the driver means 116, 514, and 515. In the illustrated embodiment, the driver control means comprises a motor controller 120 and is connected to a power transfer means 122 comprising two conductors such that power is transferred to the motor controller 120 from the low voltage switch 510 such that, if the automobile's power system 512 loses power, the low voltage switch 510 will transfer power to the motor controller 120 from the manual release backup battery 508 to effect a manual release routine as shown in FIG. 18. The motor controller 120 is connected to a mode control means 123 by a second power transfer means 121 comprising four conductors such that the mode control means 123 can transmit a control signal to the motor controller 120. Finally, three power transfer means 117, 118, and 119 connect the motor controller 120 to a group of motors comprising motor 116, motor 514, and motor 515 such that power can be transferred from the motor controller 120 to the motors 116, 514, and 515.

The present example embodiment shows a motor controller 120 as a driver control means. Of course, an acceptable embodiment of the invention need not include a motor controller 120. A logic chip 401, as shown in FIG. 3, includes, in alternative embodiments, the function of a driver control means 120, if, for example, the logic chip 401 directly controls the functioning of the driver means 116, 514, and 515.

Figure 3:
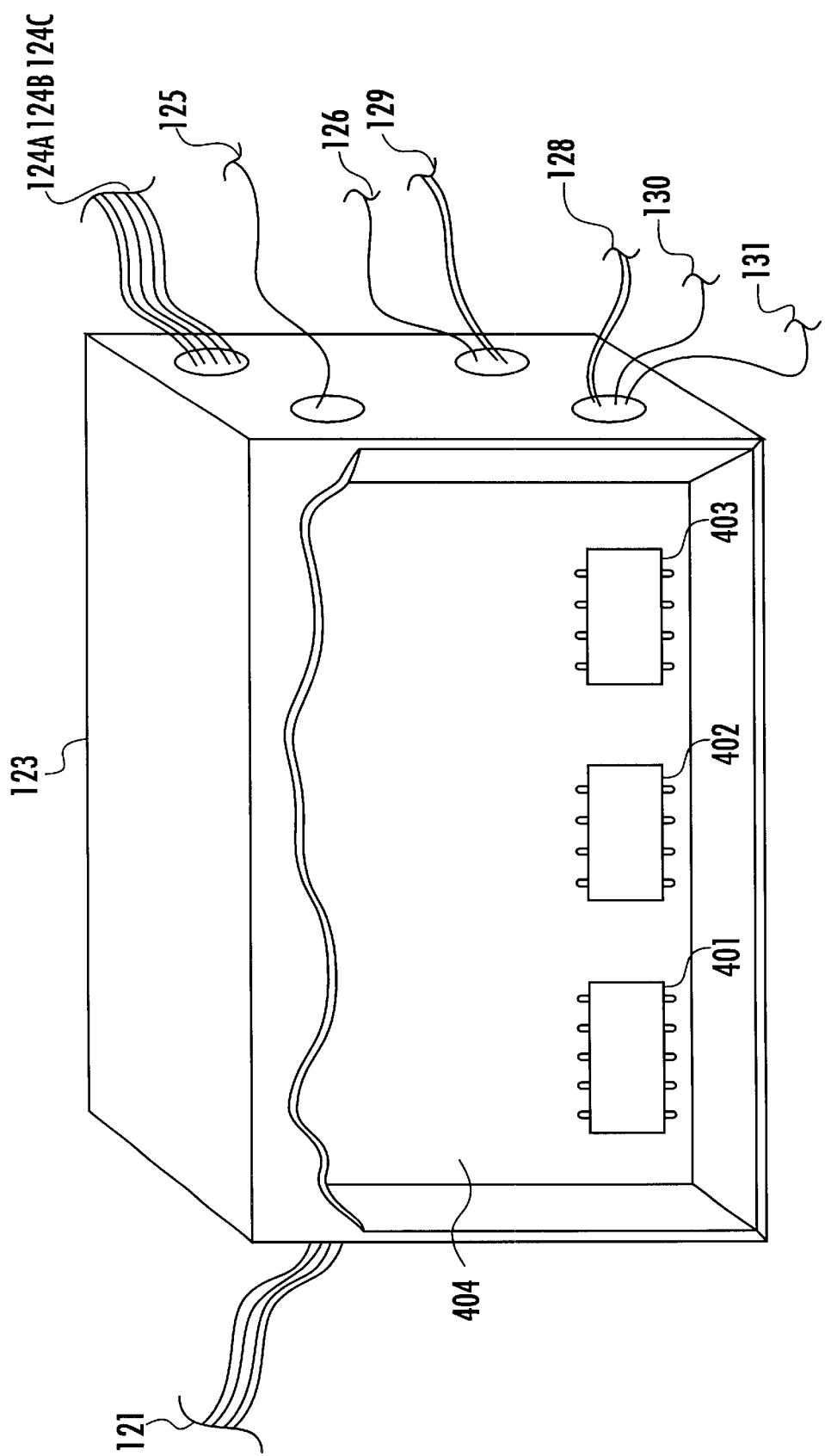
FIG. 3 depicts a three-dimensional mode controller for the first example embodiment of the invention.

Sixth, referring to FIGS. 1, 3 and 4, a mode control means 123. The mode control means 123 comprises a logic chip 401 containing modes of operation as described in FIGS. 5–18 for determining an action as required, an output means comprising one output relay chip 403 for transmitting the action as instructed by the logic chip 401, an input means comprising one input relay chip 402 for receiving input signals for the logic chip 401, a pane position storage means comprising random access memory incorporated into the logic chip 401 for storing the state of the invention such that the current pane positions are available to the modes of operation, FIGS. 5–18, in the logic chip 401, an interconnection means comprising one printed circuit board 404 for interconnecting the logic chip 401, the output relay chip 403, the input relay chip 402, and power transfer means 121, 124A–C, 125–131 and 517.

More particularly, power transfer means 121, 130, and 131, connect with the mode controller 123 output relay 403 through the printed circuit board 404 and power means 124A–C, 125–127, 129 and 517 connect with the mode controller 123 input relay 402 through the printed circuit board 404. Additionally, a power transfer means 128 comprising two conductors interconnects the low voltage switch 510 with the printed circuit board 404 such that power is transferred to mode controller 123 under normal conditions, from the automobile's power system 512 or from the manual release backup battery 508 if the automobile's power system 512 triggered the low voltage switch 510 to change states by lowering voltage below a preset voltage level of the low voltage switch 510.

The present example embodiment discusses a mode control means 123 containing a logic chip 401, an output relay chip 403, an input relay chip 402 and random access memory incorporated into the logic chip 401. Of course, an acceptable embodiment of the invention need not include the output relay chip 403 when, for instance, a driver control means 120 is used that directly accesses the output of the logic chip 401 or the logic chip 401 directly controls the drivers 116, 514, and 515, as will be understood by those of skill in the art. A further acceptable embodiment of the invention need not include the input relay chip 402 when, for instance, a driver control means 120 is used that directly accesses the input of the logic chip 401 or the logic chip 401 directly controls the drivers 116, 514, and 515. Finally, an acceptable embodiment of the invention need not include the logic chip 401 when, for instance, software performing the functions shown in FIGS. 5–18, is run on a computer that has an interface compatible with a driver control means 120.

Alternative acceptable embodiments for the logic chip 401 include a set and any combination of digital logic gate chips, mechanical or semiconductor relays, transistors, and cams or gears on one or more cylindrical rigid member constructed such that the functions shown in FIGS. 5–18 are accomplished. Additionally, the random access memory need not be incorporated in a logic chip 401 or even be used at all as the pane position storage means. Acceptable embodiments for the pane position storage means include, for instance, separate random access memory chips or a set of or any combination of transistors, transducers, solenoids, and switches.

Finally, referring again to FIGS. 1 and 2, a means for receiving an input signal in the form of a user control panel 204. The user control panel 204 comprises three switches 201, 202, and 203 with seven positions which are connected to power transfer means 124A, 124B, and 124C comprising five conductors, such that the position of the switches 201, 202, and 203 can be determined by the mode control means 123. A first switch comprises of a raise-lower switch 201 indicating a user mode of operation comprising raise, lower, and no action. A second switch comprises of an automatic mode engaged switch 202 indicating a user mode of operation comprising automatic mode engaged and automatic mode disengaged. A third switch comprises of a manual release switch 203 indicating a user mode of operation comprising manual release engaged and manual release disengaged. The mode of operation for each switch is discussed in detail in the discussions of FIGS. 5–18.

Figure 2:
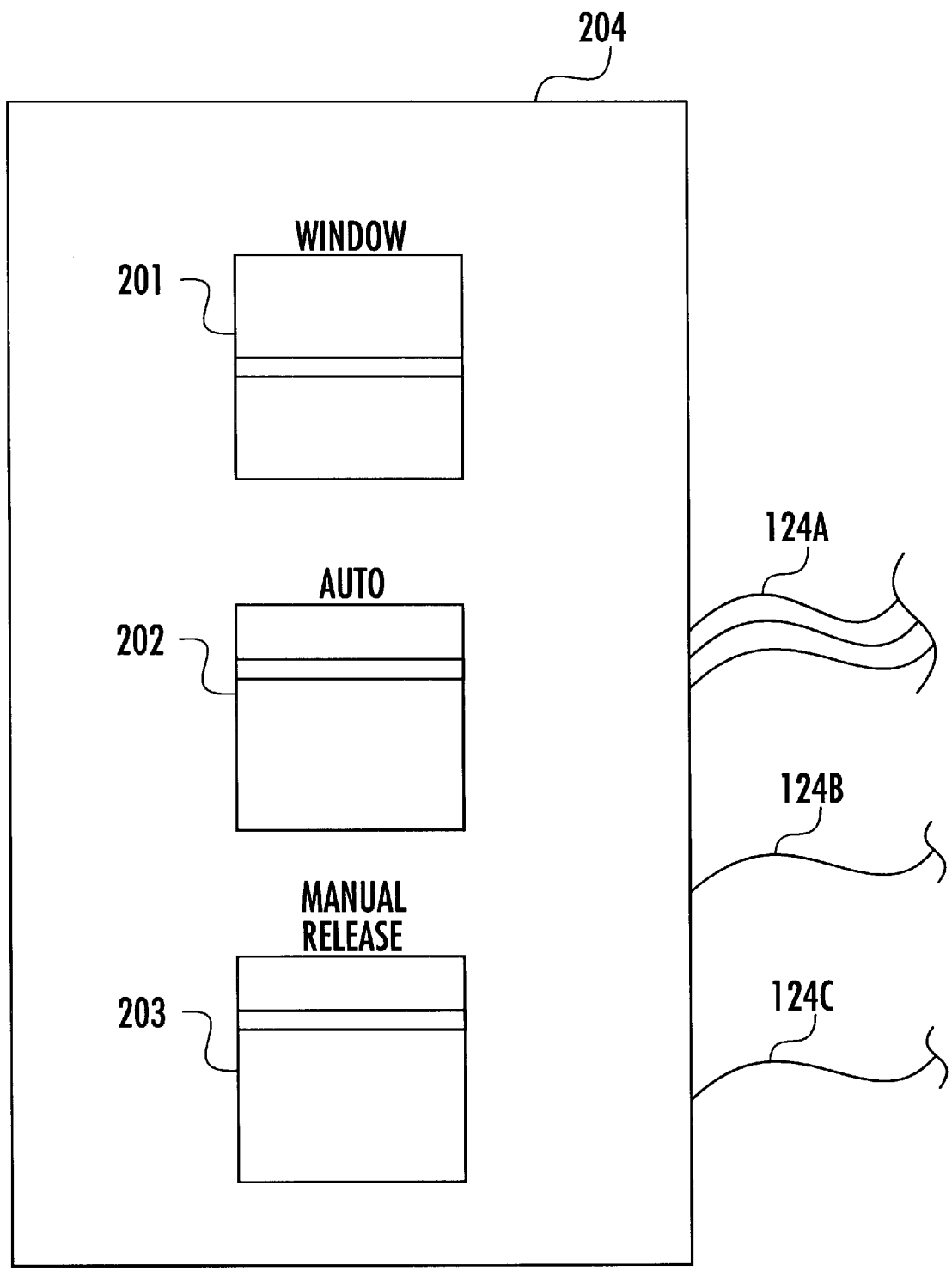
FIG. 2 depicts a two-dimensional user control panel for the first example embodiment of the invention.

The present example embodiment discusses a user control panel comprising switches and FIG. 2 depicts two toggle switches 202 and 203 and a spring-loaded toggle switch 201. Of course, acceptable embodiments of the invention incorporate other means to receive input signals such as a set or any combination of hand cranks, switches, transducers, solenoids, and microprocessors in, for instance, a personal computer, a personal digital assistant, an alarm system, a distributive control system, and a programmable logic controller. More particularly, a switch includes any device that can change state in response to an event such as a change in or application of light, heat, pressure, level of a liquid, volume of a liquid, volume of a solid, density of a solid, volume of a gas, density of a gas, acceleration, velocity, displacement, energy, or work. A transducer includes any device which converts mechanical energy into electrical energy and a solenoid is any device that converts electrical energy into mechanical energy.

Referring to FIG. 4, there is shown an overall, single line, electrical interconnection diagram for each of the electrical components of the example embodiment of the invention. This figure summarizes the electrical connections of the invention as discussed above and incorporates the interconnection of additional electrical override signals for the example embodiment comprising an optical sensor 501, a failure indicator 503, and a remote control receiver 506A and a power backup system for the manual release system 508 and 510. The optical sensor 501 comprises a low voltage switch 510 for monitoring light intensity levels outside the vehicle and is connected to the input relay chip 402 by a power transfer means comprising two conductors 125. An automobile's power system 512 is connected to the failure indicator 503 by a power transfer means 505 comprising two conductors. The failure indicator 503 for monitoring the automobile's power system 512 is connected to the input relay chip 402 by a power transfer means comprising two conductors 127. The automobile's power system 512 also connects to a low voltage switch 510 such that the low voltage switch 510 will transfer the power of an alternate power source, a manual release back-up battery 508, if the automobile's power system 512 decreases below a preset level such as eleven volts. The remote control receiver 506A comprises a single two position switch for receiving a signal from a remote transmitter 506B and is connected to the input relay chip 401 by a power transfer means comprising two conductors 126. The power backup system 508 and 510 for the manual release system 203 and 513 comprises a manual release backup battery 508 connected to a low voltage switch 510 by a power transfer means 509 comprising two conductors such that power is transferred to the automobile's power system 512 when the manual release switch 203 is engaged, if the automobile's power system 512 fails.

The present example embodiment discusses power transfer means as comprising conductors for electricity. Of course power transfer means includes any means compatible with the components in the embodiment of the invention. For example, an acceptable embodiment of the invention includes a system in which mode control means 123, driver control means 120, driver means 116, 514, and 515, and actuator means 107 functions are accomplished with compressed air and solenoid valves.

Figure 5:
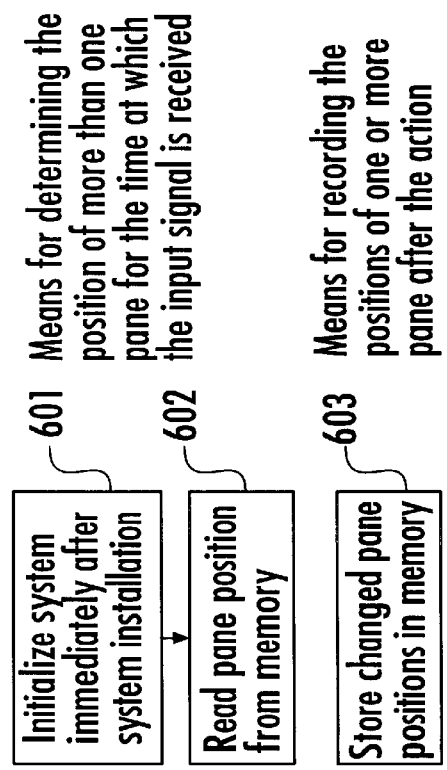

Referring to FIG. 5, there is shown an example flow chart of a software program used as a means for determining the position of more than one pane for the time at which an input signal is received and a means for recording the positions of the more than one pane after an action is performed, as is burned, for this embodiment, into the semiconductor of the logic chip 401 in FIG. 3. The determining the position of more than one pane for the time at which an input signal is received comprises an initialization step 601 upon installation, a read pane positions from memory step 602, and a store changed positions in memory step 603. The initialization step 601 allows the software to know exactly the position of the windows at that time. The present embodiment requires that all windows be lowered when the system is first powered. Further acceptable embodiments include an embodiment with a reset button on the printed circuit board 404 shown in FIG. 3, to allow the software program to be reset at any time after installation and an embodiment having a dip switch that allows the initial positions of each pane to be selected at installation. After the initialization step 601, the pane positions are read from memory 602, as required, and any changes to the positions of the panes are stored in memory 603.

Figure 6:
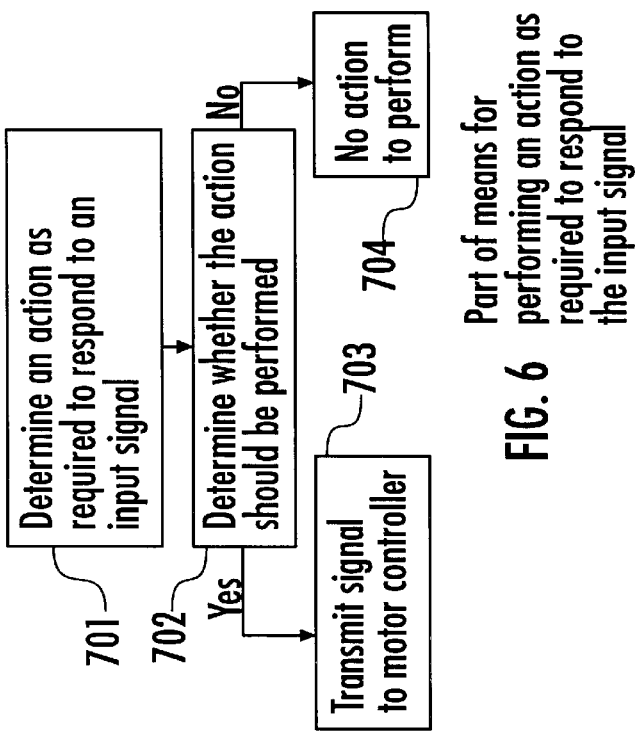

Referring to FIG. 6, there is shown an example flow chart of the general functioning of a software program used as a part of a means for performing an action as required to respond to an input signal with three general steps comprising determining an action as required to respond to an input signal 701, determining whether the action needs to be performed 702 considering the current pane positions, and performing, if necessary, the action by transmitting a signal 703 to the motor controller 120, shown in FIGS. 1 and 4, as is burned, for this embodiment, into the semiconductor of the logic chip 401 in FIGS. 3 and 4.

Figure 8:
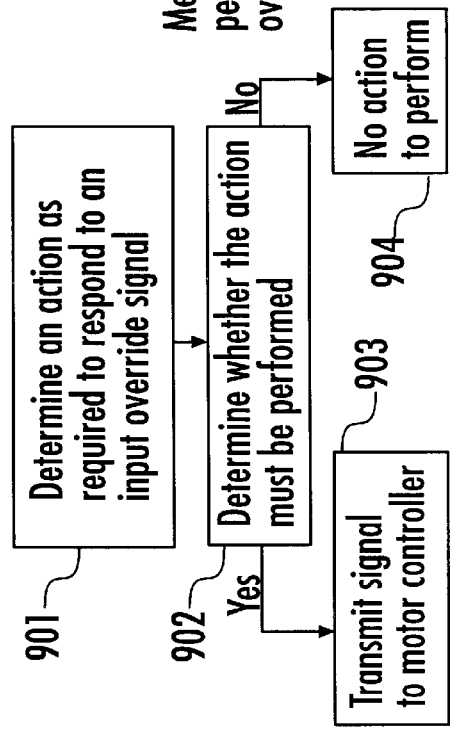
Figure 7:
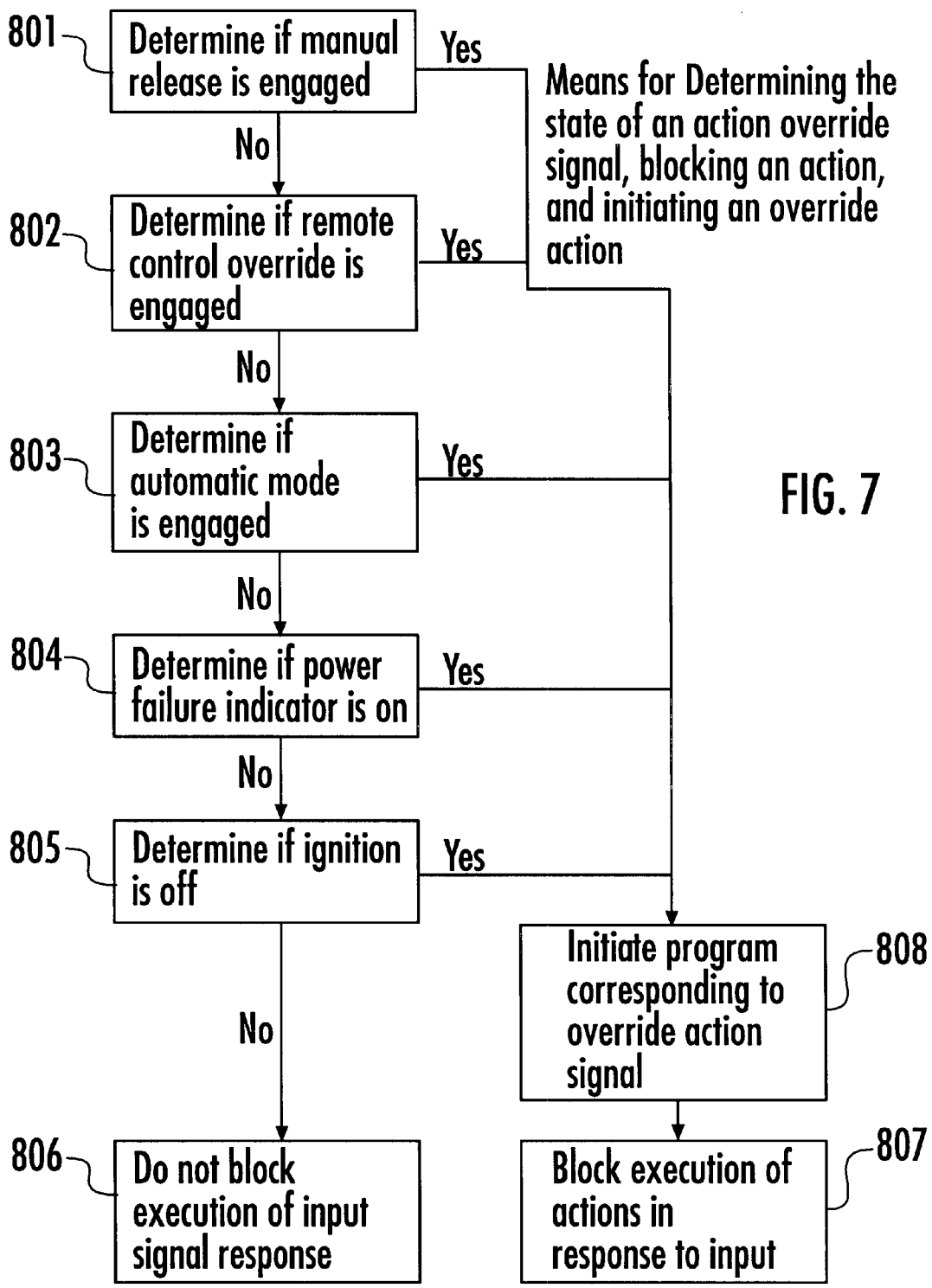

Referring to FIGS. 7 and 8, there is shown an example flow chart of the functioning of a software program used as a means for determining the state of an action override signal, a means for blocking the action as required to respond to the input signal received, based on the positions of the more than one pane, and a means to initiate performance of an action by the means for performing an action as required in response to an override signal as received, as is burned, for this embodiment, into the semiconductor of the logic chip 401 in FIG. 3.

Referring to FIG. 7, there is shown the means for determining the state of an action override signal, a means for blocking an action and a means for initiating an override action, for the present embodiment, that comprises of reading the input override signal from each input override device by the input relay chip 402, shown in FIG. 3. The first input override signal that can interrupt the action of transmitting a raise or lower signal is a manual release engaged input override signal 801. When the manual release is engaged, the tinted 102 and opaque 101 panes are to be lowered and power window raise-lower switch 201, as shown in FIGS. 2 and 4, is disabled as a safety feature for the occupants of the automobile. To accomplish this feature, response to input signals is blocked 807 and a manual release engaged software program is initiated 808. The second input override signal that can interrupt the action of transmitting a raise or lower signal is a remote control override engaged signal 802. As with the manual release engaged signal 801, when the remote control override is engaged 802, the tinted 102 and opaque 101 panes are to be lowered and power window raise-lower switch 201, as shown in FIGS. 2 and 4, is disabled as a safety feature for the occupants of the automobile. The response to input signals is blocked 807 and a manual release engaged software program is initiated 808. The third override input signal that can interrupt the action of transmitting a raise or lower signal is an automatic mode engaged signal 803. When the automatic mode is engaged 803, execution of actions in response to input signals will be blocked 807 and the automatic mode software program is initiated 808. The fourth override input signal that can interrupt the action of transmitting a raise or lower signal is a failure indicator on signal 804. When the failure indicator is on 804, execution of actions in response to input signals will be blocked 807 and a failure indicator on software program is initiated 808. The failure indicator in the present embodiment indicates a power failure so the invention treats the failure as a manual release engaged signal and disengages the invention for the safety of the occupants of the automobile. The fifth override input signal that can interrupt the action of transmitting a raise or lower signal is an ignition off input override signal 805. When the ignition is off 805, execution of actions in response to input signals will be blocked 807 and an ignition off input override software program is initiated 808. An alternative acceptable embodiment allows the clear glass to be raised although the ignition is off. The present embodiment, however, conserves battery power by allowing the functions to be performed only when the alternator is powering the automobile. If any of the override input signals 801–805 are present, execution of actions in response to input signals will be blocked 807 and a software program corresponding to the action override signal is initiated 808. Otherwise, execution of actions in response to input signals are not blocked 806.

Referring to FIG. 8, there is shown an example flow chart of the functioning of a software program used as a part of a means for initiating an action as required to respond to the input override signal with three general steps comprising determining an action as required to respond to an input override signal 901, determining whether the action needs to be performed 902 considering the current pane positions, and performing, if necessary, the action by transmitting a signal 903 to the motor controller 120, as shown in FIGS. 1 and 4, as is burned, for this embodiment, into the semiconductor of the logic chip 401 in FIGS. 3 and 4.

Figure 9:
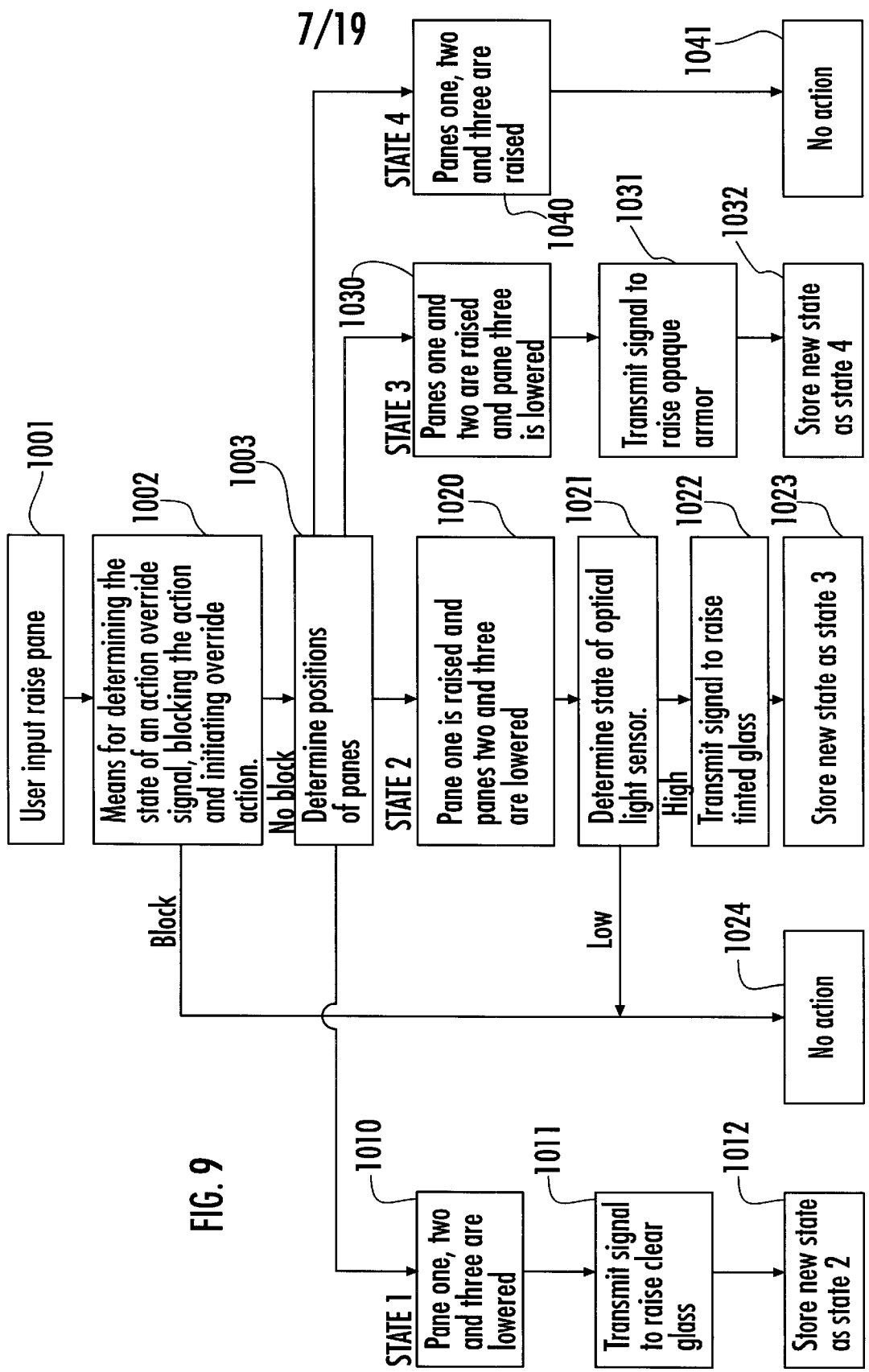

Referring to FIG. 9, there is shown an example flow chart of the functioning of a software program for the present embodiment when an input signal is received to raise a pane 1001. The first step in the present embodiment comprises determining the state of action override input signals, a means for blocking action, and a means to initiate an override action 1002, as required, to respond to the input signal received 1001, as shown in detail and discussed for FIG. 7. If an action override signal is present then no action will be performed 1024. The second step comprises determining the positions of the panes 101, 102, and 103 by retrieving the positions of the panes from memory 1003. If the clear glass pane 103, tinted glass pane 102, and opaque armor 101 are all lowered, then the software follows the state 1 path 1010. The clear glass is raised 1013 and the new state of the invention, state 2, is stored in memory 1014.

The present embodiment of the invention has a single raise-lower, spring to off switch 201, as shown in FIGS. 2 and 4, and the logic chip 401, as shown in FIGS. 3 and 4, interprets an input of raise as a single input signal to raise 1001 such that the act of pressing the raise-lower switch 201 into the raise position only raises a single panel, the next sequential panel. The switch 201 must be set to the off position before a second raise input signal is accepted. An acceptable embodiment of the invention would raise a second sequential panel if the switch is held in the raise position until after the first panel is completely raised.

In the state 2 path 1020, wherein the clear glass 103 is raised and the tinted 102 and opaque 101 panes are lowered prior to the input signal to raise a pane 1001, one override input signal 1021 can interrupt the action of transmitting a signal to raise 1022 the tinted glass pane 102. The override signal that can interrupt the action of transmitting a signal to raise 1022 the tinted glass 102 is a low light intensity signal of an optical sensor 1021. If the low light intensity signal of the optical sensor 1021 is present then no action is performed 1024. Otherwise, a signal is transmitted 1022 to raise the tinted glass pane 102 and the new state of the invention, state 3, is stored in memory 1023. Other acceptable embodiments of the invention do not include an optical sensor or include a switch such that the switch can be in a position wherein the input override signal of the optical sensor 1021 is ignored.

In the state 3 path 1030, wherein the clear glass 103 and tinted glass 102 are raised and the opaque pane 101 is lowered prior to the input signal to raise a pane 1001, a signal is transmitted 1031 to raise the opaque armor pane 101 and the new state of the invention, state 4, is stored in memory 1032.

In the state 4 path 1040, wherein the clear glass 103, tinted glass 102, and opaque armor 101 are raised prior to the input signal to raise a pane 1001, no action is performed 1041 and the input signal 1001 is ignored since there are no panes available to raise.

Figure 10:
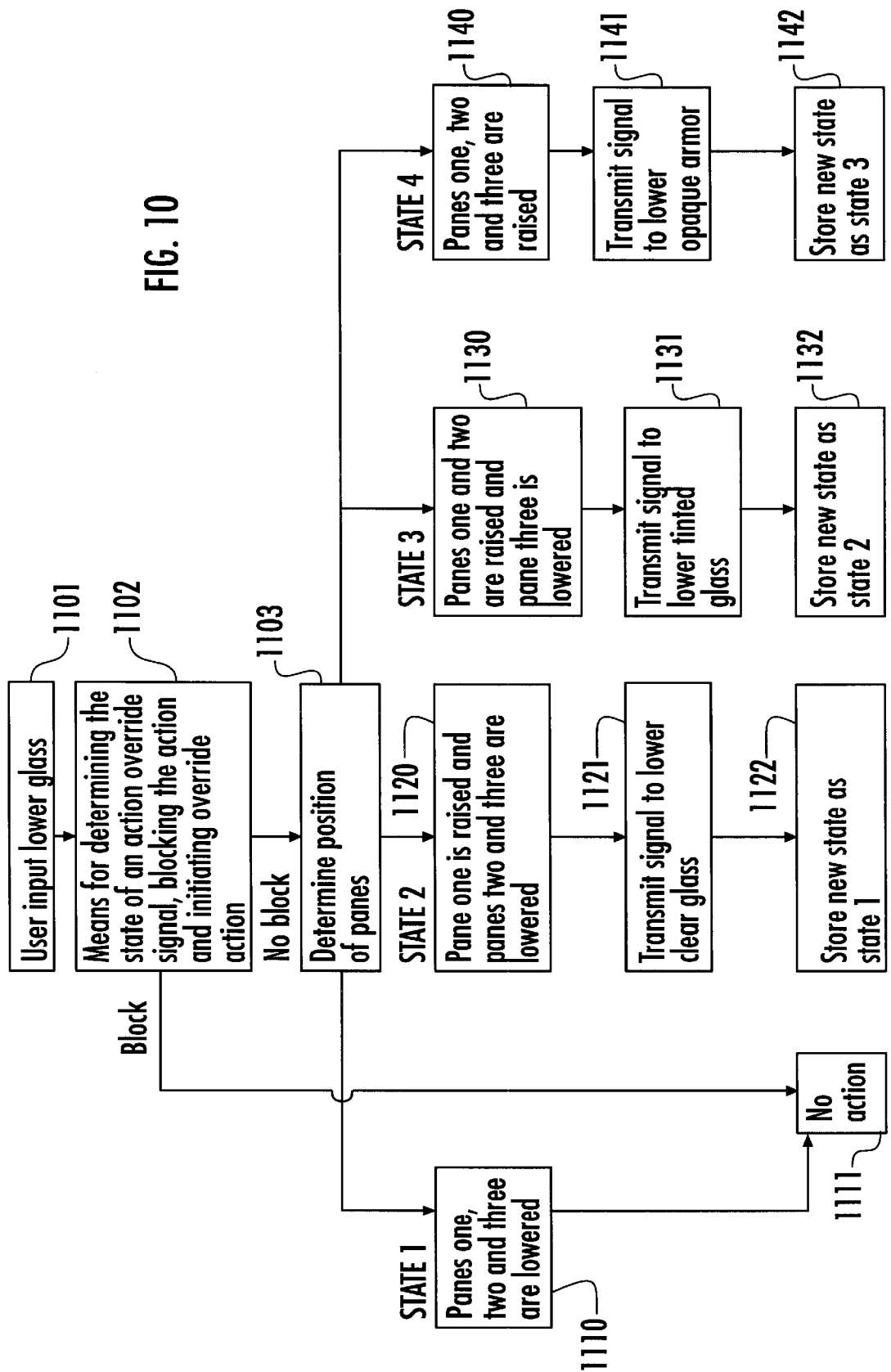

Referring to FIG. 10, there is shown an example flow chart of the functioning of a software program for the present embodiment when an input signal is received to lower a pane 1101. The first step in the present embodiment comprises determining the state of action override input signals, a means for blocking action, and a means for initiating an override action 1102, as required, to respond to the input signal received 1101, as shown in detail and discussed for FIG. 7. If an action override signal is present then no action will be performed 1111. The second step comprises determining the positions of the panes 101, 102, and 103 by retrieving the positions of the panes from memory 1103. If the clear glass pane 103, tinted glass pane 102, and the opaque armor 101 are all lowered, then the software follows the state 1 path 1110. No action is performed 1111 and the signal 1101 is ignored since there are no panes available to lower.

In the state 2 path 1120, wherein the clear glass 103 is raised and tinted glass 102 and the opaque pane 101 are lowered prior to the input signal to lower a pane 1101, a signal is transmitted 1121 to lower the clear glass pane 103 and the new state of the invention, state 1, is stored in memory 1122.

In the state 3 path 1130, wherein the clear glass 103 and tinted glass 102 are raised and the opaque pane 101 is lowered prior to the input signal to lower a pane 1101, a signal is transmitted 1131 to lower the tinted glass pane 102 and the new state of the invention, state 2, is stored in memory 1132.

In the state 4 path 1140, wherein the clear glass 103, tinted glass 102, and the opaque pane 101 are raised prior to the input signal to lower a pane 1101, a signal is transmitted 1141 to lower the opaque armor 101 and the new state of the invention, state 2, is stored in memory 1142.

Figure 11B:
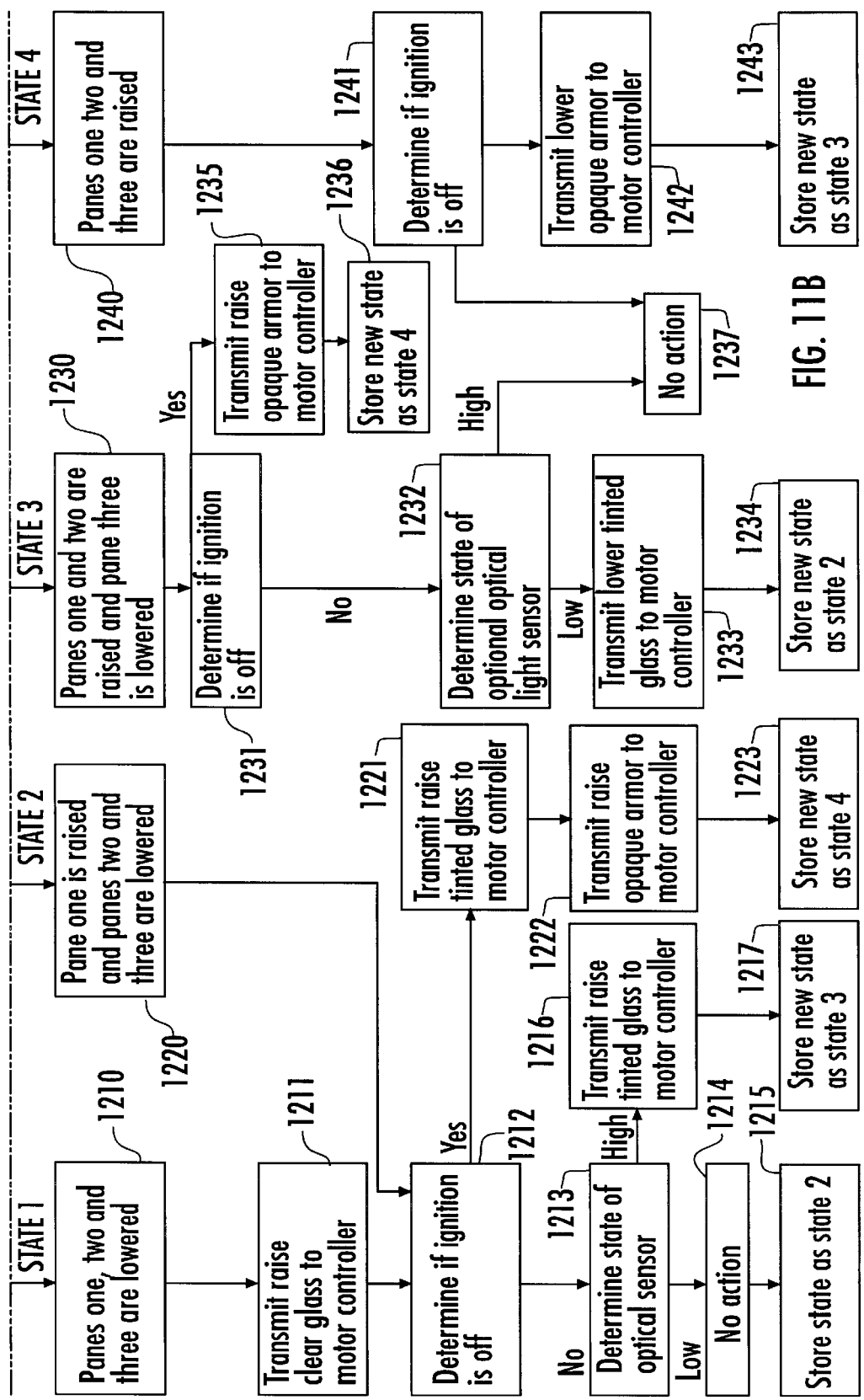

Referring to FIG. 11, there is shown an example flow chart of the functioning of a software program for the present embodiment when an input override signal is received to engage automatic mode 1201. The first step in the present embodiment comprises storing the pre-override pane positions in an override memory 1202 such that the pre-override conditions can be read and restored when no override signals are present. This step is accomplished in the present embodiment by copying the state of the invention from the memory storing the current state to the pre-override memory, both of which are incorporated in the logic chip 401, as shown in FIGS. 3 and 4. Steps two, three, and four consist of determining the state of other input override signals 1203, 1204 and 1205, each of which have a higher priority response than the automatic mode engaged override input 1201. In step two, if the manual release is engaged 1203 then no action 1207 will be performed in response to the automatic mode engaged override input 1201. In step three, if the remote control override is engaged 1204 then no action 1207 will be performed in response to the automatic mode engaged override input 1201. In step four, if the failure indicator is on 1205 then no action 1207 will be performed in response to the automatic mode engaged override input 1201. After determining the state of the override input signals 1203, 1204, and 1205, the next step is to determine the positions of the panes 101, 102, and 103 by retrieving the current state of the invention from memory incorporated in the logic chip 401, as shown in FIGS. 3 and 4. If all the panes 101, 102 and 103, as shown in FIG. 1, are lowered then state 1 is the state of the invention 1210. In the state 1 path 1210, the first step is to transmit a signal to raise 1211 the clear glass 103 to the motor controller 120. The second step for the state 1 path 1212 begins with the first step of the state 2 path 1212, as shown on the flow chart in FIG. 11. The second step of the state 1 path and the first step of the state 2 path comprises determining whether the ignition is off 1212. If the ignition is off 1212 then a signal is transmitted to raise 1221 the tinted glass 102, a signal is transmitted to raise 1222 the opaque pane 101, and the new state of the invention, state 4, is stored in memory 1223. Otherwise, the next step is to determine the state of the optical sensor 1213. If the state of the optical sensor is high then a signal is transmitted to raise 1216 the tinted glass 102 and the new state of the invention, state 3, is stored in memory 1217. Otherwise no action is performed 1214, and the state of the invention, state 1, is stored in memory 1215.

In the state 3 path 1230 wherein the clear glass 103 and the tinted glass 102 are raised and the opaque armor 101 is lowered, the first step comprises determining whether the ignition is off 1231. If the ignition is off 1231 then a signal is transmitted to raise 1235 the opaque armor 101 and the new state of the invention, state 4, is stored in memory 1236. Otherwise, the next step is to determine the state of the optical sensor 1232. If the state of the optical sensor is high then no action is performed 1237. Otherwise a signal is transmitted to lower 1233 the tinted glass 102 and the new state of the invention, state 2, is stored in memory 1234.

In the state 4 path 1240 wherein all the panes 101, 102, and 103 are raised, the first step comprises determining if the ignition is off 1241. If the ignition is off 1241 then no action is performed 1237. Otherwise a signal is transmitted to lower 1242 the opaque armor 101 and the new state of the invention, state 3, is stored in memory 1243.

Referring to FIG. 12, there is shown an example flow chart of the functioning of a software program for the present embodiment when a remote control input override signal is received 1301. The first step in the present embodiment comprises storing the pre-override pane positions in a pre-override memory 1302 such that the pre-override positions can be read and restored when no override signals are present. This step is accomplished in the present embodiment by copying the state of the invention from the memory storing the current state to the pre-override memory, both of which are incorporated in the logic chip 401, as shown in FIGS. 3 and 4. Step 2 activates a manual release routine 1303 wherein the tinted glass 102 and the opaque armor 101 panes are lowered, as required. The manual release routine is shown in FIG. 18 and described in detail in the discussion of FIG. 18. In step 3, the new state of the invention, state 2, is stored in memory 1304.

Referring to FIG. 13, there is shown an example flow chart of the functioning of a software program for the present embodiment when a remote control override is engaged 1401. The first step in the present embodiment comprises a storing the pre-override pane positions in a pre-override memory 1402 such that the pre-override positions can be read and restored when no override signals are present. This step is accomplished in the present embodiment by copying the state of the invention from the memory storing the current state to the pre-override memory, both of which are incorporated in the logic chip 401, as shown in FIGS. 3 and 4. Step 2 activates a manual release routine 1403 wherein the tinted glass 102 and the opaque armor 101 panes are lowered, as required. The manual release routine is shown in FIG. 18 and described in detail in the discussion of FIG. 18. In step 3, the new state of the invention, state 2, is stored in memory 1404.

Referring to FIG. 14, there is shown an example flow chart of the functioning of a software program for the present embodiment when a manual release is engaged 1501. The first step in the present embodiment comprises a storing the pre-override pane positions in a pre-override memory 1502 such that the pre-override positions can be read and restored when no override signals are present. This step is accomplished in the present embodiment by copying the state of the invention from the memory storing the current state to the pre-override memory, both of which are incorporated in the logic chip 401, as shown in FIGS. 3 and 4. Step 2 activates a manual release routine 1503 wherein the tinted glass 102 and the opaque armor 101 panes are lowered, as required. The manual release routine is shown in FIG. 18 and described in detail in the discussion of FIG. 18. In step 3, the new state of the invention, state 2, is stored in memory 1504.

Referring to FIG. 15, there is shown an example flow chart of the functioning of a software program for the present embodiment when an ignition is turned on 1601. When the ignition is turned on 1601 the step essentially removes an override input signal. The first step in the present embodiment comprises a means for determining the state of action override input signals, a means for blocking action, and a means for initiating an override action 1602, as required, to respond to the input signal received 1601, as shown in detail and discussed for FIG. 7. If another override signal is present then no action will be performed 1606. Otherwise, the second step comprises determining the positions of the panes by retrieving the positions of the panes from pre-override memory 1603, which is incorporated in the logic chip 401, as shown in FIGS. 3 and 4. The third step in the present embodiment comprises transmitting actions to the motor controller as required 1604 to restore the embodiment of the invention to the state it was in prior to the override input signal. In the last step, the new state of the invention, as retrieved from the pre-override memory, is stored in the current state memory 1605, both of which are incorporated in the logic chip 401, as shown in FIGS. 3 and 4.

Figure 16:
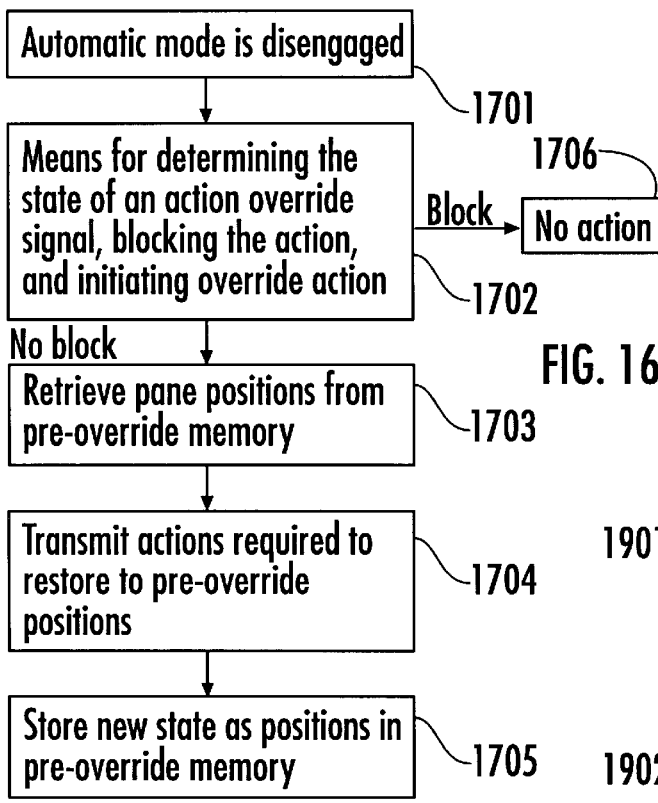

Referring to FIG. 16, there is shown an example flow chart of the functioning of a software program for the present embodiment when an automatic mode 202, as shown in FIGS. 2 and 4, is disengaged 1701. When the automatic mode is disengaged 1701 the step essentially removes an override input signal. The first step in the present embodiment comprises determining the state of action override input signals, a means for blocking action, and a means for initiating an override action 1702, as required, to respond to the input signal received 1701, as shown in detail and discussed for FIG. 7. If another override signal is present then no action will be performed 1706. Otherwise, the second step comprises determining the positions of the panes by retrieving the positions of the panes from pre-override memory 1703, which is incorporated in the logic chip 401, as shown in FIGS. 3 and 4. The third step in the present embodiment comprises transmitting actions to the motor controller as required 1704 to restore the embodiment of the invention to the state it was in prior to the override input signal. In the last step, the new state of the invention, as retrieved from the pre-override memory, is stored in the current state memory 1705, both of which are incorporated in the logic chip 401, as shown in FIGS. 3 and 4.

Figure 17:
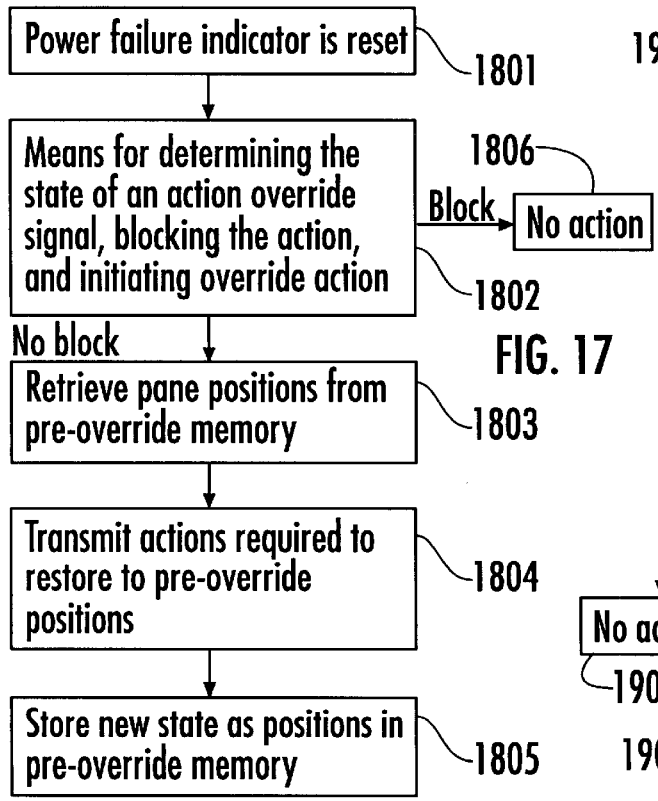

Referring to FIG. 17, there is shown an example flow chart of the functioning of a software program for the present embodiment when the power failure indicator 503, as shown in FIG. 4, is reset 1801. When the power failure indicator 503 is reset 1801 the step essentially removes an override input signal. The first step in the present embodiment comprises determining the state of action override input signals, a means for blocking action, and a means for initiating an override action 1802, as required, to respond to the input signal received 1801, as shown in detail and discussed for FIG. 7. If another override signal is present then no action will be performed 1806. Otherwise, the second step comprises determining the positions of the panes by retrieving the positions of the panes from pre-override memory 1803, which is incorporated in the logic chip 401, as shown in FIGS. 3 and 4. The third step in the present embodiment comprises transmitting actions to the motor controller as required 1804 to restore the embodiment of the invention to the state it was in prior to the override input signal. In the last step, the new state of the invention, as retrieved from the pre-override memory, is stored in the current state memory 1805, both of which are incorporated in the logic chip 401, as shown in FIGS. 3 and 4.

Referring to FIG. 18, there is shown an example flow chart of the functioning of a software program for the present embodiment when a manual release routine 1901 is called by another software program, as shown in FIGS. 5–17 incorporated in the logic chip 401 shown in FIGS. 3 and 4. The first step in the present embodiment comprises determining current pane positions by retrieving the current state of the invention from memory in the logic chip 401. In the second step, signals are transmitted 1903 to the motor controller 120, as shown in FIGS. 1 and 4, to lower the tinted glass 102 and the opaque armor 101, as required. If neither the tinted glass 102, nor the opaque armor 101 are raised according to the current state then no signal is transmitted 1903. The third step comprises determining the state of the mechanical failure indicator 1904. If the mechanical failure indicator 1904 is not on then the motors 116, 514, and 515, as shown in FIG. 4, are lowering the panes so no additional action is required. If, however, the mechanical failure indicator 1904 is on then one of the actuators 107, as shown in FIG. 1, for the panes 101 and 102, is malfunctioning such that one of the panes 101 and 102, is not being lowered. Therefore, a signal, in step five, is transmitted 1905 to the driver-actuator decoupling means 513. The driver-actuator decoupling means 513 responds to the signal by decoupling the drivers 514 and 515, from the actuators 107 such that the panes 101 and 102, can be pushed down manually.

Figure 19:
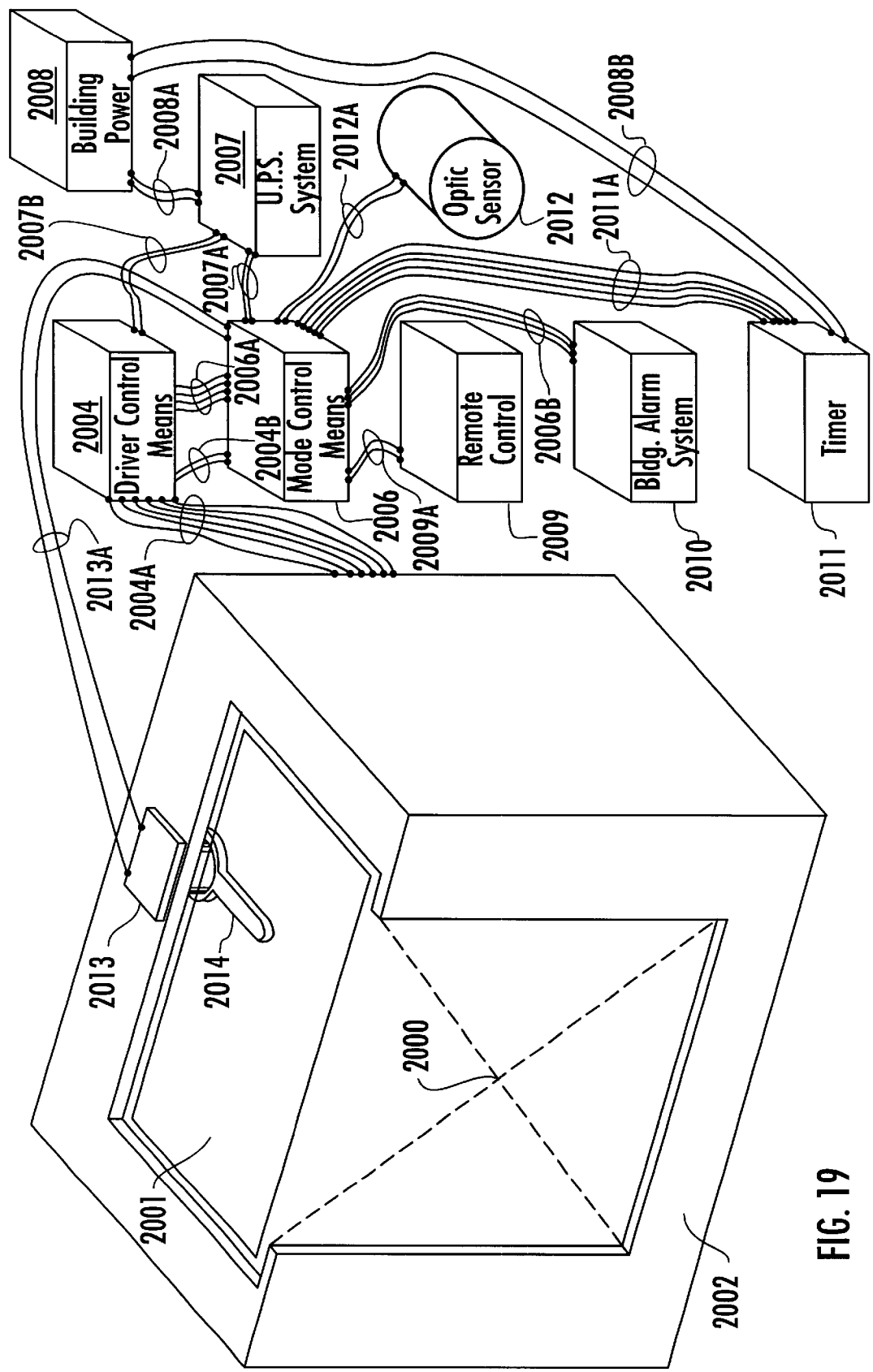
FIG. 19 depicts a second, three-dimensional, example embodiment of the invention including electrical interconnection.

Referring to FIG. 19, there is shown a device for changing the amount of light penetration through a viewing port 2000 of a building as a second example embodiment of the invention comprising:

First, referring again to FIG. 19, a changeable, light penetration limiting device comprising a liquid crystal device 2001 such that the liquid crystal device 2001 covers the entire viewing port 2000. The liquid crystal device 2001 is seated within a window frame 2002 such that power can be transferred from a power transfer means comprising more than one conductor 2004A to the liquid crystal device 2001.

Second, referring again to FIG. 19, a driver control means comprising a liquid crystal driver 2004 containing a failure detection device. The liquid crystal driver 2001 connects to the more than one conductor 2004A such that power can be transferred from the liquid crystal driver 2004 to the liquid crystal device 2001. The more than one conductor varies in the number of conductors depending on the changeable, light penetration limiting device and the driver control means chosen. The failure detection device incorporated in the liquid crystal driver 2004 transmits a signal to a mode controller 2006, as discussed below, to indicate when the liquid crystal device 2001 is not functioning correctly. The liquid crystal driver 2001 also connects to a power transfer means comprising two conductors 2007B such that power can be transferred from an uninterruptible power source 2007 to the liquid crystal driver 2001.

A further acceptable embodiment of the invention incorporates a changeable, light penetration limiting device which is not a liquid crystal pane 2001 but has similar characteristics to the liquid crystal device 2001. The present embodiment requires only that the device can change from substantially clear to substantially opaque. In addition, although power in the present embodiment of the invention is transferred electrically, an acceptable embodiment of the invention transfers power by another form of energy such as heat or work. The selection of the driver control means is dependent on the selection of the changeable, light penetration limiting pane since the driver control means must be matched with the changeable, light penetration limiting device such that the driver means outputs the form of energy required by the changeable, light penetration limiting device.

Figure 20:
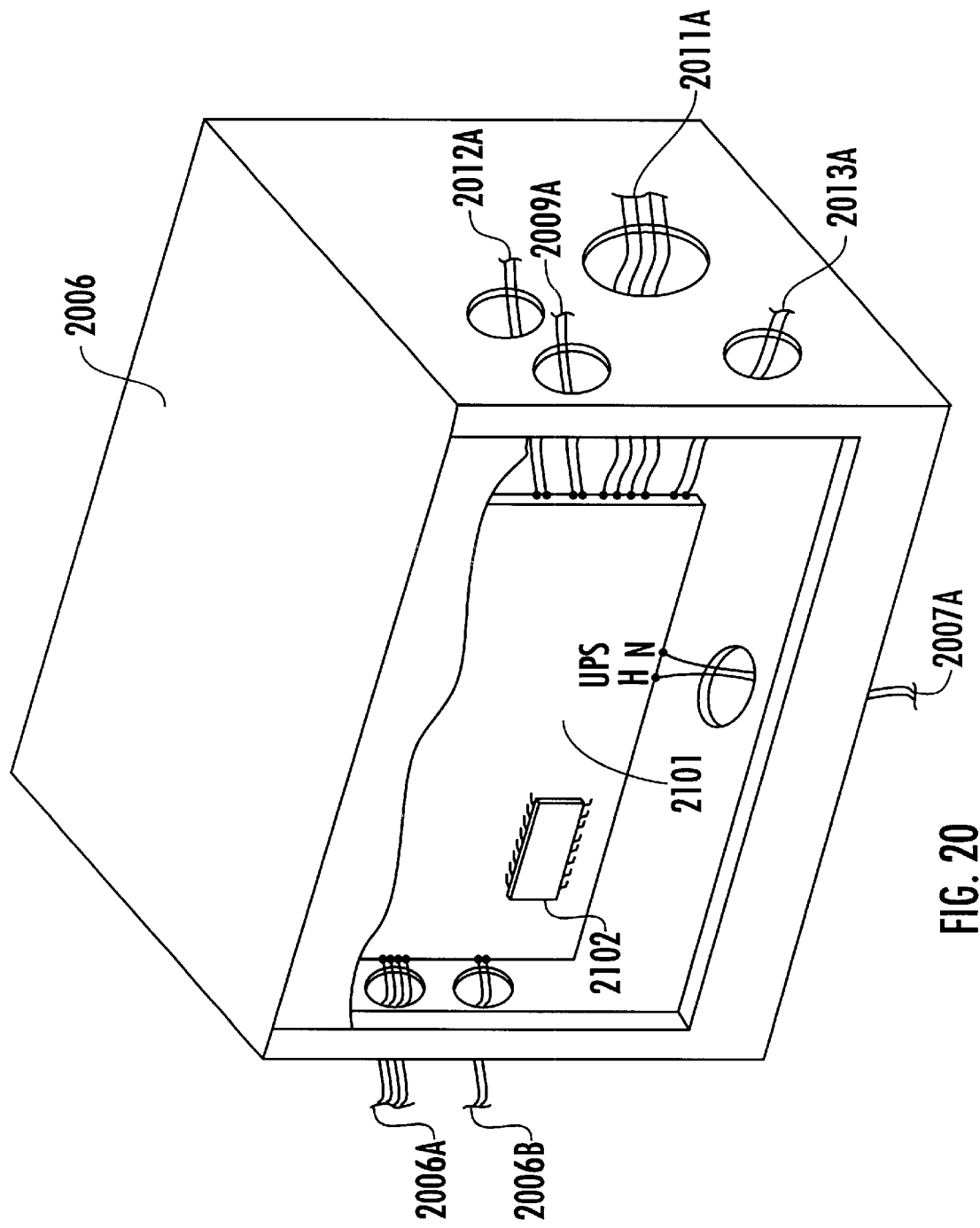
FIG. 20 depicts a three-dimensional mode controller for the second example embodiment of the invention.

Third, referring to FIGS. 19 and 20, a mode control means 2006 comprising a printed circuit board 2101 and a logic chip 2102. The logic chip 2102 comprising modes of operation as described in FIGS. 22–34 for determining an action as required, a current state memory containing the current degree of shading of the liquid crystal device 2001, and an override memory containing the degree of shading of the liquid crystal display prior to receiving an override signal, as described in FIGS. 22–34. The mode control means 2006 connects to a power transfer means comprising more than one conductor 2006A such that the logic chip 2102 via the printed circuit board 2101 can transmit signals to the liquid crystal driver 2004 to increase and decrease the intensity of the liquid crystal device 2001. Increasing the intensity of the liquid crystal device 2001 causes the liquid crystal device 2001 to appear darker and decreases the light penetration through the viewing port 2000. Decreasing the intensity of the liquid crystal device 2001 causes the liquid crystal device 2001 to appear lighter and increases the light penetration through the viewing port 2000.

A further acceptable embodiment of the invention need not include the logic chip 2102 when, for instance, software, performing the modes of operation shown in FIGS. 22–34, is run on a computer that has an interface compatible with the liquid crystal driver 2004.

Alternative acceptable embodiments for the logic chip 2102 include a set and any combination of digital logic gate chips, mechanical or semiconductor relays, transistors, and cams or gears on one or more cylindrical rigid member constructed such that the functions shown in FIGS. 22–34 are accomplished. Additionally, the random access memory need not be incorporated in a logic chip 2102. Acceptable embodiments for the current state memory or override memory include, for instance, separate random access memory chips or a set of or any combination of transistors, transducers, solenoids, and switches.

Fourth, referring again to FIGS. 19 and 20, an uninterruptible power source 2007 to supply power to the mode control means 2006 in case of a failure in a building power source 2008 such that the mode controller can continue to function as an alarm device for a building alarm system 2010. The uninterruptable power source 2007 is connected to the printed circuit board 2101 via a power transfer means comprising two conductors 2007A. In addition, the uninterruptible power source 2007 connects to the building power source 2008 via a power transfer means comprising of two conductors 2008A.

Fifth, referring to FIG. 19, a override signal device comprising a window pane locking mechanism means comprising a rotatable member 2014 connected to the liquid crystal pane 2001, and a rigid member 2013 connected to the window seal frame 2002, such that the liquid crystal pane 2001 can be locked in a position covering the view port 2000. A power transfer means comprising two conductors 2013A connects from the rigid member 2013 to the mode control means 2006 such that the mode control means 2006 receives an indication when the liquid crystal pane 2001 is unlocked as a signal to override the concurrent mode of operation of the present embodiment of the invention, as discussed in FIGS. 22–34.

A further acceptable embodiment of the invention does not include an uninterruptible power source 2007. The uninterruptible power source 2007 is included for an improved protection system for the viewing port 2000. The improved protection is provided by the uninterruptible power source 2007 and the failure detection device incorporated in the liquid crystal driver 2004.

A further acceptable embodiment of the invention does not include a liquid crystal pane unlocked power transfer means 2013A. This feature provides improved security and is not required for the primary function of an embodiment of the invention.

A further acceptable embodiment of the invention does not include a locking mechanism means 2013 and 2014. The locking mechanism means 2013 and 2014 is an added safety feature.

Sixth, referring again to FIG. 19, an override signal device comprising a remote control receiver 2009 for receiving a signal to override the current mode of operation of the present embodiment of the invention, as discussed in FIGS. 22–34. The remote control receiver 2009 functions to improve security by allowing a user to change the liquid crystal pane 2001 to clear before entering the building.

A further embodiment of the invention does not include a remote control receiver 2009. The remote control receiver 2009 provides an added safety feature and is not required for the primary function of an embodiment of the invention.

Seventh, referring again to FIG. 19, an override signal device comprising an optical sensor 2012 for receiving a signal to override the current mode of operation of the present embodiment of the invention, as discussed in FIGS. 22–34. The optical sensor 2012 comprises of a resistive device that varies in resistance in relation to a change of light intensity.

A further acceptable embodiment of the invention includes an optical sensor 2012 with less output levels such as a two state optical sensor which outputs a high and low intensity signal only.

A further acceptable embodiment of the invention does not include an optical sensor 2012. The automatic mode of operation in the logic chip 2102 can be replaced or supplemented by a timer 2011, as discussed below.

Figure 21:
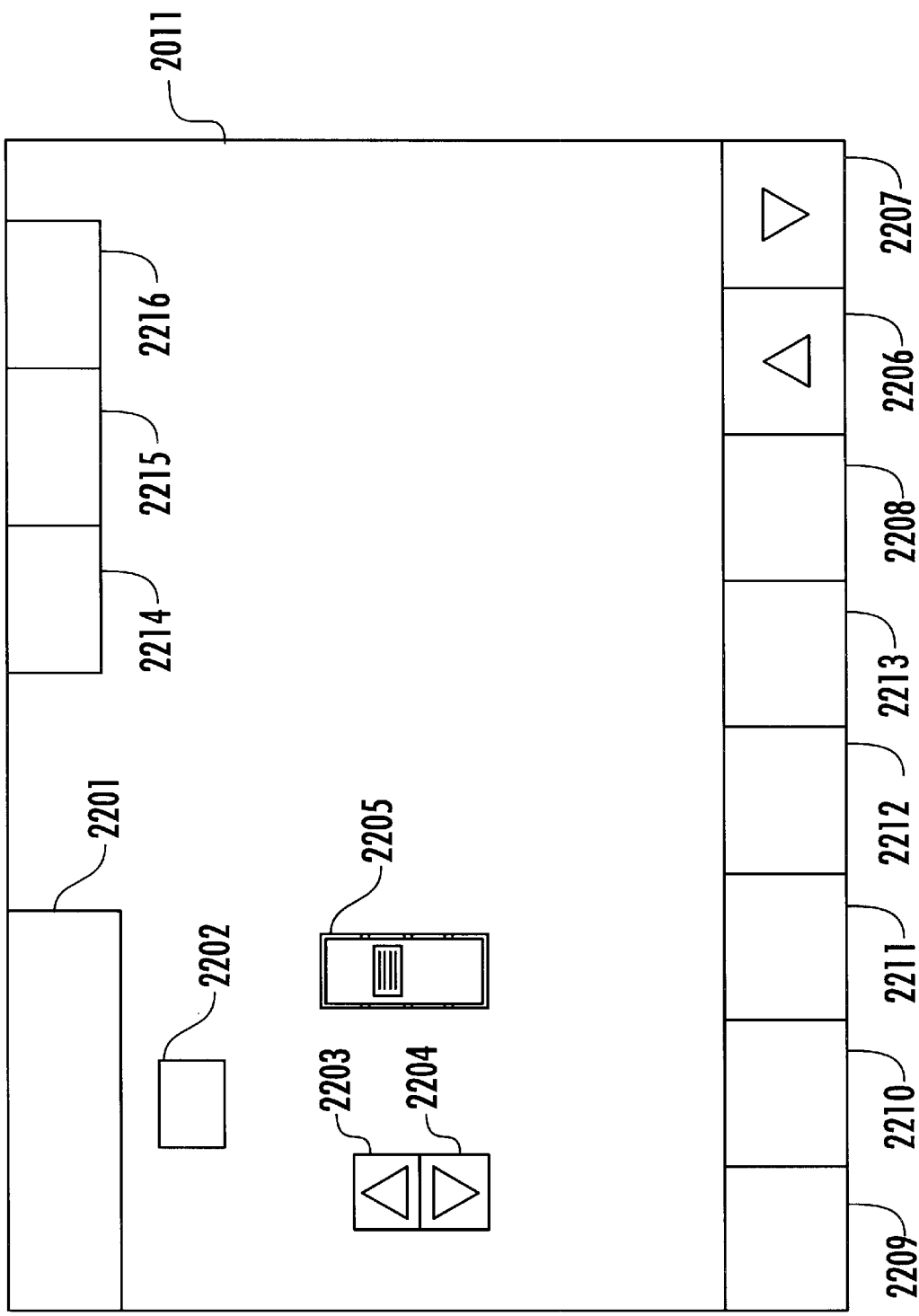
FIG. 21 depicts a two dimensional user input panel with timer for the second example embodiment of the invention.

Eighth, referring to FIGS. 19 and 21, a user input panel comprising three switches 2203, 2204, and 2205, and an override signal device comprising a timer 2011 comprising of twelve switches 2202 and 2205–2216, a timer memory, a timer read only memory containing software programs, and a display means 2201 for displaying the current time and/or date, the current program, and the current desired degree of shading of the panes. The user control panel comprises a two position "darker" switch 2203, a two position "lighter" switch 2204, and a four position off-manual-auto-opaque switch 2205. The description of the operation of the switches in the user control panel are discussed below with the modes of operation in FIGS. 22–34. The timer 2011 is an elaborate override signal device that adds functionality to the invention. A maximum light penetration set switch 2202 allows the user to set a desired light penetration level by pressing the maximum light penetration set switch 2202 when the light penetration is at a desirable level. The timer 2011 determines the maximum light penetration by reading the current light intensity from the input of the optical sensor 2012 in the mode control means 2006 determines the present degree of shading by reading the level from the memory in the timer 2011, and storing the ratio of light intensity to degree of shading in the timer memory. The "darker" switch 2203 and "lighter" switch 2204 provide additional functions when the "Program 1" switch 2214, "Program 2" switch 2215, or "Program 3" switch 2216, has been pressed. When one of the program switches 2214, 2215, and 2216 has been pressed, the timer 2011 allows the user to set times and days for the program to run using the "Year" switch 2209, the "Month" switch 2210, the "Day" switch 2211, the "Hour" switch 2212, and the "Minute" switch 2213, as well as settings of the intensity of the liquid crystal display 2001 by using the "darker" switch 2203 and the "lighter" switch 2204. The timer 2011 stores the user programs in the timer memory and generates override signals for the mode control means 2006 to execute the user programs.

Referring again to FIGS. 19 and 21, the timer 2011 connects to the mode controller 2006 via a power transfer means comprising of more than one conductor 2011A, as required by the timer 2011. The number of conductors required by the timer 2011 can vary depending upon the manufacturer of the timer 2011.

A further acceptable embodiment of the invention replaces the timer 2011 with a user control panel comprising switches 2203–2205, a maximum light penetration set switch 2202 for setting the desired level of light penetration, and a random access memory chip on the printed circuit board 2101 for storing the desired level of light penetration.

A further acceptable embodiment of the invention includes only a user panel comprising a "darker" switch 2203 and a "lighter" switch 2204 allowing the user to only manually modify the light penetration level.

Figure 22:
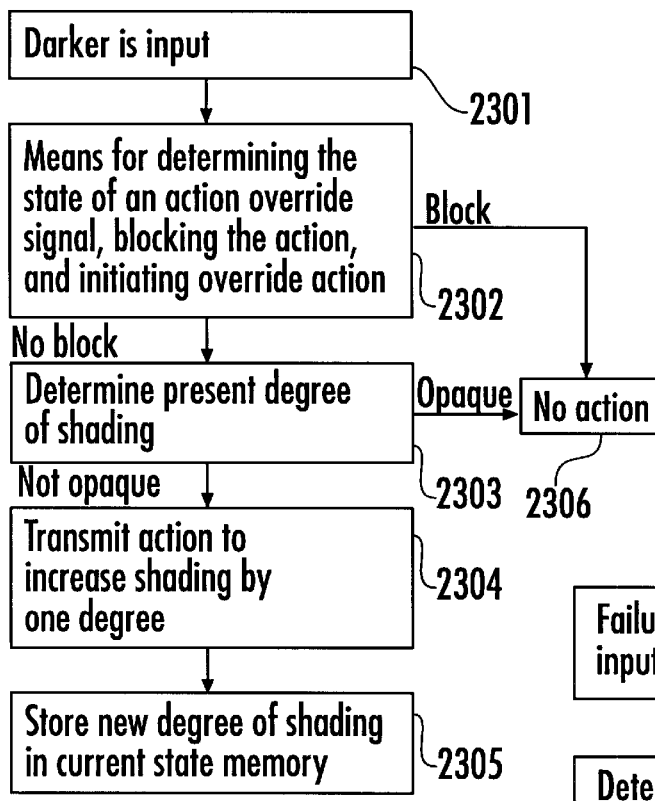

Referring to FIG. 22, there is shown an example flow chart of the functioning of a software program for the present embodiment when an input signal is received to darken the pane 2301 from the "darker" switch 2203 shown in FIG. 21. The first step in the present embodiment comprises determining the state of action override input signals, a means for blocking action, and a means for initiating an override action 2302, as required, to respond to the input signal received 2301, as shown in detail and discussed for FIG. 24. If an action override signal is present then no action will be performed 2306. The second step comprises determining the current degree of shading 2303 of the changeable, light penetration limiting device 2001 by retrieving the current degree of shading from the current state memory incorporated in the logic chip 2102 shown in FIG. 20. If the current degree of shading is opaque then no action is performed 2306. Otherwise, a signal is transmitted from the mode control means 2006 to the liquid crystal driver 2004 to increase the degree of shading by one degree 2304 and the new degree of shading is stored in the current state memory 2305.

Figure 23:
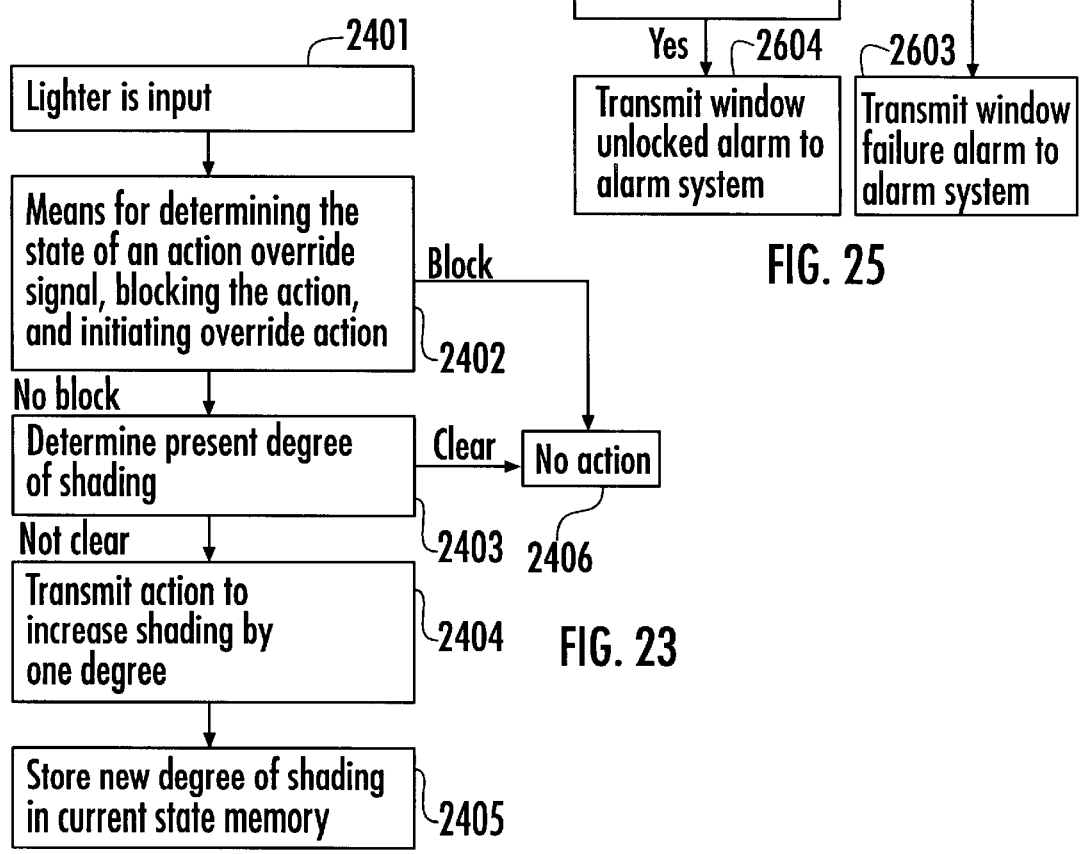

Referring to FIG. 23, there is shown an example flow chart of the functioning of a software program for the present embodiment when an input signal is received to lighten the pane 2401 from the "lighter" switch 2204 shown in FIG. 21. The first step in the present embodiment comprises determining the state of action override input signals, a means for blocking action, and a means for initiating an override action 2402, as required, to respond to the input signal received 2401, as shown in detail and discussed for FIG. 24. If an action override signal is present then no action will be performed 2406. The second step comprises determining the current degree of shading 2403 by retrieving the current degree of shading from the current state memory incorporated in the logic chip 2102 shown in FIG. 20. If the current degree of shading is clear then no action is performed 2406. Otherwise, a signal is transmitted from the mode controller 2006 to the liquid crystal driver 2004 to decrease the degree of shading by one degree 2404 and the new degree of shading is stored in the current state memory 2405.

Referring to FIG. 24, there is shown the means for determining the state of an action override signal, blocking and action, and initiating an override action, for the present embodiment,.that comprises of reading the input override signal from each input override device by the logic chip 2102, shown in FIG. 20. The first input override signal that can interrupt the action of transmitting a darken pane 2301 or lighten pane 2401 signal is a liquid crystal pane unlocked input override signal 2501. When the liquid crystal pane 2001 is unlocked, the power to the liquid crystal pane 2001 is to be removed as a safety feature for the users of the liquid crystal pane 2001. To accomplish this feature, the execution of action in response to input signals will be blocked 2508 and a software program will be initiated 2509 to transmit a signal to the liquid crystal driver to disconnect power 2703 as shown in FIG. 26 and discussed below. The second input override signal that can interrupt the action of transmitting a darken pane 2301 or lighten pane 2401 signal is a remote control override engaged signal 2502. As with the liquid crystal pane unlocked signal 2501, when the remote control override is engaged 2502, the power to the liquid crystal pane 2001 is to be removed as a safety feature for the users of the liquid crystal pane 2001 the execution of action in response to input signals will be blocked 2508 and a remote control override engaged software program will be initiated 2509. The third override input signal that can interrupt the action of transmitting a darken pane 2301 or lighten pane 2401 signal is an automatic mode engaged signal 2503. When the automatic mode is engaged 2503, execution of actions in response to input signals will be blocked 2508 and a automatic mode override engaged software program will be initiated 2509. The fourth override input signal that can interrupt the action of transmitting a darken pane 2301 or lighten pane 2401 signal is an opaque on signal 2504. When opaque is on 2504, execution of actions in response to input signals will be blocked 2508 and a opaque on override software program will be initiated 2509. The opaque on signal in the present embodiment indicates a user override input to make the liquid crystal pane opaque. The fifth override input signal that can interrupt the action of transmitting a darken pane 2301 or lighten pane 2401 signal is a system off signal 2505. When the system is off 2505, execution of actions in response to input signals will be blocked 2508 and a system off override software program will be initiated 2509. The system off signal, in the present embodiment, indicates a user override input to make the liquid crystal pane clear. The sixth override input signal that can interrupt the action of transmitting a darken pane 2301 or lighten pane 2401 signal is a failure indicator is on signal 2506. When the failure indicator is on 2506, execution of actions in response to input signals will be blocked 2508 and a failure indicator on override software program will be initiated 2509. If any of the override input signals 2501–2505 are present, execution of actions in response to input signals will be blocked 2508 and a corresponding override software program will be initiated 2509.

Otherwise, execution of actions in response to input signals are not blocked 2507.

Figure 25:
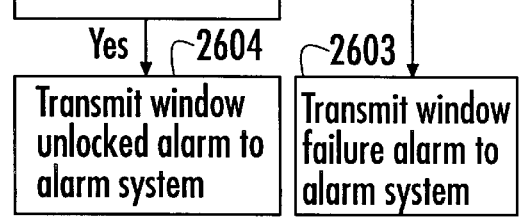

Referring to FIG. 25, there is shown an example flow chart of the functioning of a software program for the present embodiment when an action override input signal is received indicating a failure has been detected 2601. The first step in the present embodiment comprises determining whether the liquid crystal pane 2001 is unlocked 2602. If the liquid crystal pane 2001 is unlocked, a signal is transmitted to the building alarm system 2010 indicating the liquid crystal pane 2001 is unlocked 2604 . Otherwise a signal is transmitted to the building alarm system 2010 indicating that the liquid crystal pane 2001 has failed 2603. A failure of the liquid crystal pane 2001 can be caused by a purposeful breakage of the liquid crystal pane 2001 indicating an intruder or by a failure of the liquid crystal pane 2001.

A further acceptable embodiment of the invention does not include the failure detection device in the liquid crystal driver 2001. The failure indication in the liquid crystal driver is an option that serves to increase the security of the building and decrease maintenance of the liquid crystal pane 2001.

Referring to FIG. 26, there is shown an example flow chart of the functioning of a software program for the present embodiment when an action override input signal is received indicating the liquid crystal pane 2001 is unlocked 2701. The first step in the present embodiment comprises storing the current degree of shading in the action override memory 2702 incorporated in the logic chip 2102. The second step in the present embodiment comprises transmitting a signal to the liquid crystal driver 2004 to disconnect power 2703 to the liquid crystal pane 2001. The third step in the present embodiment comprises storing the current degree of shading as clear 2704.

Referring to FIG. 27, there is shown an example flow chart of the functioning of a software program for the present embodiment when an action override input signal is received indicating the liquid crystal pane 2001 has been locked 2801. The first step in the present embodiment comprises determining the state of action override input signals, a means for blocking action, and a means for initiating an override action 2802, as required, to respond to the input signal received 2801, as shown in detail and discussed for FIG. 24. If an action override signal is present then no action will be performed 2806. The second step in the present embodiment comprises determining the degree of shading in the action override memory 2803 incorporated in the logic chip 2102. The third step in the present embodiment comprises transmitting a darken panel signal to the liquid crystal driver 2004 until the current degree of shading matches the degree of shading in the action override memory 2804. The fourth step in the present embodiment comprises storing the current degree of shading in the current state memory 2805.

Figure 28:
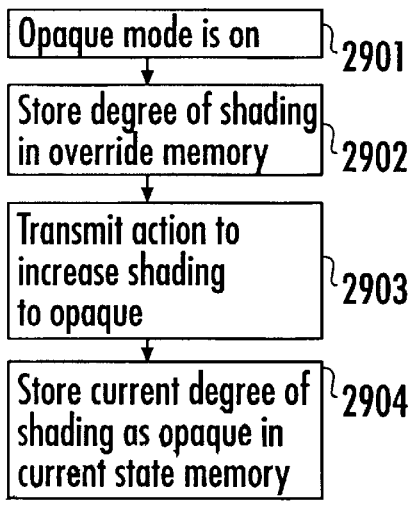

Referring to FIG. 28, there is shown an example flow chart of the functioning of a software program for the present embodiment when an action override input signal is received indicating opaque mode is on 2901. The first step in the present embodiment comprises storing the current degree of shading in the action override memory 2902 incorporated in the logic chip 2102. The second step in the present embodiment comprises transmitting a darken panel signal to the liquid crystal driver 2004 until the current degree of shading is opaque 2903. The third step in the present embodiment comprises storing the current degree of shading in the current state memory as opaque 2904.

Figure 29:
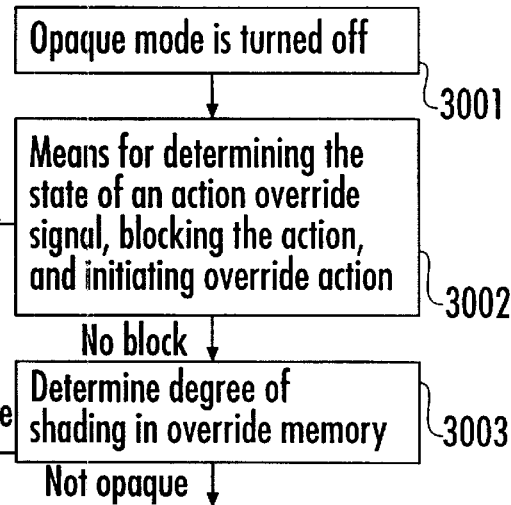

Referring to FIG. 29, there is shown an example flow chart of the functioning of a software program for the present embodiment when an action override input signal is received indicating the opaque mode has been turned off 3001. The first step in the present embodiment comprises determining the state of action override input signals, a means for blocking action, and a means for initiating an override action 3002, as required, to respond to the input signal received 3001, as shown in detail and discussed for FIG. 24. If an action override signal is present then no action will be performed 3006. The second step in the present embodiment comprises determining the degree of shading in the action override memory 3003 incorporated in the logic chip 2102. The third step in the present embodiment comprises transmitting a lighten panel signal to the liquid crystal driver 2004 until the current degree of shading matches the degree of shading in the action override memory 3004. The third step in the present embodiment comprises storing the current degree of shading in the current state memory 3005.

Figure 30:
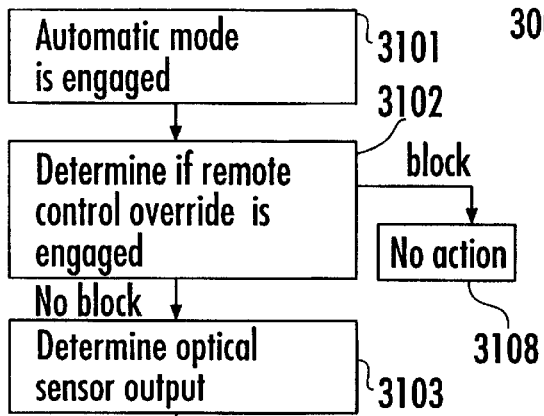

Referring to FIG. 30, there is shown an example flow chart of the functioning of a software program for the present embodiment when an action override input signal is received indicating the automatic mode is engaged 3101. The first step in the present embodiment comprises determining whether the remote control override is engaged 3102. If the remote control override is engaged 3102 then no action is performed 3108. The second step in the present embodiment comprises determining state of the optical sensor 3103. The third step in the present embodiment comprises determining the degree of shading required for the present light intensity input from the optical sensor 3104. This step is accomplished by multiplying the maximum light penetration ratio, as set by the set switch 2202 shown in FIG. 21, by the output of the optical sensor 2102. The fourth step in the present embodiment comprises determining the current degree of shading 3105 by reading the current degree of shading from the current state memory on the logic chip 2102 shown in FIG. 20. The fifth step in the present embodiment comprises transmitting a lighten panel or darken panel signal to the liquid crystal driver 2004 until the current degree of shading substantially matches the required degree of shading 3106. The sixth step in the present embodiment comprises storing the current degree of shading in the current state memory 3107.

Figure 31:
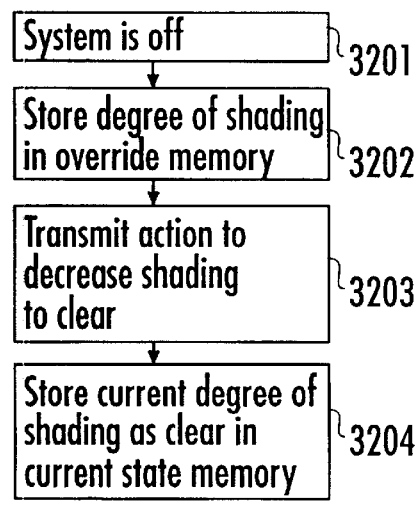

Referring to FIG. 31, there is shown an example flow chart of the functioning of a software program for the present embodiment when an action override input signal is received indicating the system is off 3201. The first step in the present embodiment comprises storing the current degree of shading in the action override memory 3202 incorporated in the logic chip 2102. The second step in the present embodiment comprises transmitting a lighten panel signal to the liquid crystal driver 2004 until the current degree of shading is clear 3203. The third step in the present embodiment comprises storing the current degree of shading in the current state memory as clear 3204.

Referring to FIG. 32, there is shown an example flow chart of the functioning of a software program for the present embodiment when an action override input signal is received indicating the system is no longer off 3301. The first step in the present embodiment comprises determining the state of action override input signals, a means for blocking action, and a means for initiating an override action 3302, as required, to respond to the input signal received 3301, as shown in detail and discussed for FIG. 24. If an action override signal is present then no action will be performed 3306. The second step in the present embodiment comprises determining the degree of shading in the action override memory 3303 incorporated in the logic chip 2102. The third step in the present embodiment comprises transmitting a darken panel signal to the liquid crystal driver 2004 until the current degree of shading matches the degree of shading in the action override memory 3304. The fourth step in the present embodiment comprises storing the current degree of shading in the current state memory 3305.

Referring to FIG. 33, there is shown an example flow chart of the functioning of a software program for the present embodiment when an action override input signal is received indicating the remote control is engaged 3401. The first step in the present embodiment comprises storing the current degree of shading in the action override memory 3402 incorporated in the logic chip 2102. The second step in the present embodiment comprises transmitting a lighten panel signal to the liquid crystal driver 2004 until the current degree of shading is clear 3403. The third step in the present embodiment comprises storing the current degree of shading in the current state memory as clear 3404.

Referring to FIG. 34, there is shown an example flow chart of the functioning of a software program for the present embodiment when an action override input signal is received indicating the remote control has been disengaged 3501. The first step in the present embodiment comprises determining the state of action override input signals, a means for blocking action, and a means for initiating an override action 3502, as required, to respond to the input signal received 3501, as shown in detail and discussed for FIG. 24. If an action override signal is present then no action will be performed 3506. The second step in the present embodiment comprises determining the degree of shading in the action override memory 3503 incorporated in the logic chip 2102. The third step in the present embodiment comprises transmitting a darken panel signal to the liquid crystal driver 2004 until the current degree of shading matches the degree of shading in the action override memory 3504. The fourth step in the present embodiment comprises storing the current degree of shading in the current state memory 3505.

It will be understood from the foregoing description that various modifications and changes may be made in the example embodiment of the present invention without departing from its true spirit. It is intended that this description is for purposes of illustration only and should not be construed in a limiting sense. The scope of this invention should be limited only by the language of the following claims.

What is claimed is:

1. A method for changing an amount of light penetration through a viewing port, comprising:
   receiving an input signal;
   determining the amount of light penetration through the viewing port at the time of said receiving an input signal;
   performing an action as required to respond to the input signal based on said determining the amount of light penetration through the viewing port at the time of said receiving an input signal; and
   recording the amount of light penetration through the viewing port after said performing an action.

2. The method according to claim 1 further comprising: determining a state of at least one action override signal and blocking said performing an action in response to the state of said at least one action override signal.

3. The method according to claim 2 further comprising initiating a performance of an override action in response to at least one action override signal.

4. The method according to claim 2 in which said determining the state of said at least one action override signal comprises determining if a view port pane is unlocked.

5. The method according to claim 2 in which said determining the state of said at least one action override signal comprises determining the state of a system off switch.

6. The method according to claim 2 in which said determining the state of said at least one action override signal comprises determining the state of a remote control.

7. The method according to claim 2 in which said determining the state of said at least one action override signal comprises determining the state of a failure indication device.

8. The method according to claim 2 in which said determining the state of said at least one action override signal comprises determining the state of an automatic mode engaged switch.

9. The method according to claim 2 in which said determining the state of said at least one action override signal comprises determining the state of an optical sensor.

10. The method according to claim 2 in which said blocking comprises terminating an execution of at least one software program.

11. The method according to claim 3 further comprising recording the amount of light penetration through the viewing port before said performance of an override action.

12. The method according to claim 11 in which said recording the amount of light penetration through the viewing port before said performance of an override action, comprises storing in a random access memory, the current degree of shading of at least one pane residing in the viewing port.

13. The method according to claim 11 in which said recording the amount of light penetration through the viewing port before said performance of an override action, comprises storing in a random access memory, a current position of at least one pane residing in the viewing port.

14. The method according to claim 1 in which said receiving an input signal comprises receiving an input signal from a group comprising a darken pane signal, a darken pane to opaque signal, a lighten pane signal, and a lighten pane to clear signal.

15. The method according to claim 1 in which said receiving an input signal comprises receiving an input signal from a group comprising a raise pane signal, a raise all panes signal, a lower pane signal, and a lower all panes signal.

16. The method according to claim I in which said determining the amount of light penetration comprises retrieving from a current state random access memory, the amount of light penetration through the viewing port.

17. The method according to claim 16 in which said retrieving the amount of light penetration through the viewing port from a current state random access memory comprises retrieving from a current state random access memory, a current degree of shading of at least one pane residing in the viewing port.

18. The method according to claim 16 in which said retrieving the amount of light penetration through the viewing port from a current state random access memory comprises retrieving from a current state random access memory, a current position of at least one pane residing in the viewing port.

19. The method according to claim 1 in which said performing an action comprises changing a degree of shading of at least one pane residing in the viewing port.

20. The method according to claim 1 in which said performing an action comprises changing a position of at least one pane residing in the viewing port.

21. The method according to claim 1 in which said recording the amount of light penetration comprises storing in a random access memory, a current degree of shading of at least one pane residing in the viewing port.

22. The method according to claim 1 in which said recording the amount of light penetration comprises storing in a random access memory, a current position of at least one pane residing in the viewing port.

23. A device for changing an amount of light penetration through a viewing port, comprising:
    a means for receiving an input signal;
    a means for determining the amount of light penetration through the viewing port at the time the input signal is received;
    a means for performing an action as required to respond to the input signal based on the amount of light penetration through the viewing port at the time the input signal is received; and
    a means for recording the amount of light penetration through the viewing port after the performance of an action.

24. The device according to claim 23 further comprising:
    a means for determining a state of at least one action override signal and a means for blocking the performance of an action in response to the state of said an action override signal.

25. The device according to claim 24 further comprising a means for initiating a performance of an override action in response to at least one action override signal.

26. The device according to claim 24 in which said means for determining the state of at least one action override signal comprises a means for determining if a view port pane is unlocked.

27. The device according to claim 24 in which said means for determining the state of said at least one action override signal comprises a means for determining the state of a system off switch.

28. The device according to claim 24 in which said means for determining the state of said at least one action override signal comprises a means for determining the state of a remote control.

29. The device according to claim 24 in which said means for determining the state of said at least one action override signal comprises a means for determining the state of a failure indication device.

30. The device according to claim 24 in which said means for determining the state of said at least one action override signal comprises a means for determining the state of an automatic mode engaged switch.

31. The device according to claim 24 in which said means for determining the state of said at least one action override signal comprises a means for determining the state of an optical sensor.

32. The device according to claim 24 in which said means for blocking comprises a means for terminating an execution of at least one software program.

33. The device according to claim 25 further comprising a means for recording the amount of light penetration through the viewing port before performance of an override action.

34. The device according to claim 33 in which said means for recording the amount of light penetration through the viewing port, before performance of an override action, comprises a means for storing in a random access memory, a current degree of shading of at least one pane residing in the viewing port.

35. The device according to claim 33 in which said means for recording the amount of light penetration through the viewing port, before performance of an override action, comprises a means for storing in a random access memory, a current position of at least one pane residing in the viewing port.

36. The device according to claim 23 in which said means for receiving an input signal comprises a means for receiving an input signal from a group comprising a darken pane signal, a darken pane to opaque signal, a lighten pane signal, and a lighten pane to clear signal.

37. The device according to claim 23 in which said means for receiving an input signal comprises a means for receiving an input signal from a group comprising a raise pane signal, a raise all panes signal, a lower pane signal, and a lower all panes signal.

38. The device according to claim 23 in which said means for determining the amount of light penetration comprises a means for retrieving from a current state random access memory, the amount of light penetration through the viewing port.

39. The device according to claim 38 in which said means for retrieving the amount of light penetration through the viewing port from a current state random access memory comprises a means for retrieving from a current state random access memory, a current degree of shading of at least one pane residing in the viewing port.

40. The device according to claim 38 in which said means for retrieving the amount of light penetration through the viewing port from a current state random access memory comprises a means for retrieving from a current state random access memory, a current position of at least one pane residing in the viewing port.

41. The device according to claim 23 in which said means for performing an action comprises a means for changing a degree of shading of at least one pane residing in the viewing port.

42. The device according to claim 23 in which said means for performing an action comprises a means for changing a position of at least one pane residing in the viewing port.

43. The device according to claim 23 in which said means for recording the amount of light penetration through the viewing port comprises a means for storing in a random access memory, a current degree of shading of at least one pane residing in the viewing port.

44. The device according to claim 23 in which said means for recording the amount of light penetration through the viewing port comprises a means for storing in a random access memory, a current position of at least one pane residing in the viewing port.

45. A device for changing an amount of light penetration through a viewing port, comprising:
   a mode controller containing light penetration modifying functions;
   an input device in signal communication with said mode controller; and
   a light penetration recorder in signal communication with said mode controller wherein said mode controller is responsive to said input device and said light penetration recorder is responsive to said mode controller.

46. The device according to claim 45 further comprising:
   an action override determiner in signal communication with and responsive to said mode controller; and
   an input action blocking device in signal communication with said mode controller wherein said input action blocking device is responsive to said action override determiner and said mode controller is responsive to said input blocking device.

47. The device according to claim 46 further comprising an override input action initiator in signal communication with said action override determiner and responsive to said action override determiner.

48. The device according to claim 47 further comprising a pre-override action recorder in signal communication with said override input action initiator and said mode controller wherein said pre-override action recorder is responsive to said override input action initiator.

49. The device according to claim 48 further comprising at least one override input device in signal communication with said action override determiner.

* * * * *

UNITED STATES PATENT AND TRADEMARK OFFICE
CERTIFICATE OF CORRECTION

PATENT NO. : 6,405,105 B1 Page 1 of 1
DATED : December 17, 1998
INVENTOR(S) : Jimmy M. Hsu et al.

It is certified that error appears in the above-identified patent and that said Letters Patent is hereby corrected as shown below:

<u>Column 24,</u>
Lines 52-54, the corrected Claim 49 should read as follows:

49. The device according to claim 46 further comprising at least one override input device in signal communication with said action override determiner.

Signed and Sealed this

Twenty-ninth Day of April, 2003

JAMES E. ROGAN
*Director of the United States Patent and Trademark Office*